US012706072B2

(12) United States Patent
Tan et al.

(10) Patent No.: US 12,706,072 B2
(45) Date of Patent: Aug. 11, 2026

(54) USING EYE TRACKING FOR SUPER RESOLUTION

(71) Applicant: Cisco Technology, Inc., San Jose, CA (US)

(72) Inventors: Jieyu Tan, Zhejiang (CN); Katerina Le Shiffer, San Ramon, CA (US); Siyuan Li, Zhejiang (CN); Kanghua Zhu, Zhejiang (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/909,263

(22) Filed: Oct. 8, 2024

(65) Prior Publication Data

US 2026/0100174 A1 Apr. 9, 2026

(51) Int. Cl.
*G09G 5/391* (2006.01)
*G02B 27/00* (2006.01)

(52) U.S. Cl.
CPC ......... *G09G 5/391* (2013.01); *G02B 27/0093* (2013.01); *G09G 2340/0407* (2013.01)

(58) Field of Classification Search
CPC ........... G09G 5/391; G09G 2340/0407; G02B 27/0093
See application file for complete search history.

(56) References Cited

U.S. PATENT DOCUMENTS 7,068,813 B2 * 6/2006 Lin ........................ H04N 19/17 375/E7.182
11,262,840 B2 3/2022 Bychkov et al.
11,367,164 B1 * 6/2022 Vaziri .................. G06T 3/4076
11,507,182 B2 11/2022 Huang
11,652,976 B1 5/2023 Ollila
(Continued)

FOREIGN PATENT DOCUMENTS

CN 111553846 A 8/2020
EP 4180920 A1 5/2023

OTHER PUBLICATIONS

Jiannan Ye, Xiaoxu Meng, Daiyun Guo, et al. Neural Foveated Super-Resolution for Real-time VR Rendering. Authorea. Nov. 9, 2023. (Year: 2023).*

(Continued)

*Primary Examiner* — Bryan Earles
(74) *Attorney, Agent, or Firm* — Edell, Shapiro & Finnan, LLC

(57) ABSTRACT

A method and system are provided for applying super-resolution to a video and/or shared content in an audio and video communication session. One or more video streams are obtained from one or more computing devices and are displayed on a display device. A layout of the displayed one or more video streams and their respective positions as displayed in the layout is obtained. The location, duration, and frequency of eye-gaze of a user associated to the display device is obtained via an eye-tracking module. A first position in the layout that matches the location of eye-gaze of the user is obtained and the corresponding duration of eye-gaze is compared to a first threshold time. Super-resolution is applied to at least one of the one or more video streams that corresponds to the first position when the duration of eye-gaze is longer than the first threshold time.

23 Claims, 11 Drawing Sheets

(56) References Cited

U.S. PATENT DOCUMENTS

| | | | | |
|---|---|---|---|---|
| 12,316,714 | B2 * | 5/2025 | Springer | H04L 67/306 |
| 2007/0162922 | A1 * | 7/2007 | Park | H04N 21/44218 725/38 |
| 2012/0146891 | A1 * | 6/2012 | Kalinli | H04N 19/33 345/156 |
| 2013/0156407 | A1 * | 6/2013 | Seok | H04N 5/783 386/343 |
| 2015/0067377 | A1 * | 3/2015 | Park | G06F 1/3234 713/340 |
| 2017/0127011 | A1 * | 5/2017 | Okajima | G09G 5/14 |
| 2018/0095531 | A1 | 4/2018 | Brown et al. | |
| 2019/0099660 | A1 * | 4/2019 | Nelson | A63F 3/00157 |
| 2020/0267427 | A1 * | 8/2020 | Rogers | H04N 21/84 |
| 2021/0294413 | A1 * | 9/2021 | Manduchi | G06F 3/013 |
| 2023/0164387 | A1 * | 5/2023 | Bustamante | H04N 21/21805 725/12 |
| 2023/0319233 | A1 | 10/2023 | Sommerlade et al. | |
| 2023/0393652 | A1 * | 12/2023 | Hawkins | H04N 7/152 |
| 2024/0036643 | A1 | 2/2024 | Linsenmaier et al. | |
| 2025/0168026 | A1 * | 5/2025 | Biggs | H04N 23/695 |

OTHER PUBLICATIONS

Apple: "Apple Announces New Accessibility Features, Including Eye Tracking, Music Haptics, and Vocal Shortcuts", https://www.apple.com/in/newsroom/2024/05/apple-announces-new-accessibility-features-including-eye-tracking/, May 15, 2024, 10 Pages.

Jiao C., et al., "SUPREYES: SUPer Resolution for EYES Using Implicit Neural Representation Learning", UIST '23, San Francisco, CA, Oct. 29-Nov. 1, 2023, 13 Pages.

Khan J., "Webex for Apple Vision Pro: Unleash the New Era of Spatial Computing to Elevate Hybrid Work", Webex Blog, https://blog.webex.com/hybrid-work/immersive-meetings-with-webex-on-apple-vision-pro/, Feb. 6, 2024, 8 Pages.

Meta: "Use Eye Tracking to Select Text Fields and Windows", Meta Community Forums, https://communityforums.atmeta.com/t5/Ideas/Use-Eye-Tracking-to-select-text-fields-and-windows/idi-p/1022816, Jan. 20, 2023, 3 Pages.

Sag A., et al., "Apple Vision Pro: A Beautiful, Flawed Bridge To The Future", Forbes, https://www.forbes.com/sites/moorinsights/2024/02/15/apple-vision-pro-a-beautiful-flawed-bridge-to-the-future/, Feb. 15, 2024, 19 Pages.

Sainio J., et al., "Eye-Controlled Region of Interest HEVC Encoding", 2018 IEEE International Symposium on Multimedia (ISM), Dec. 10-12, 2018, pp. 186-187.

Wan Q., et al., "Enhanced Head-Mounted Eye Tracking Data Analysis Using Super-Resolution", IS&T International Symposium on Electronic Imaging 2019, Stereoscopic Displays and Applications XXX, https://library.imaging.org/ei/articles/31/3/art00018, Jan. 2019, 8 Pages.

Wang L., et al., "FOCAS: Practical Video Super Resolution using Foveated Rendering", MM '21, Proceedings of the 29th ACM International Conference on Multimedia, https://dl.acm.org/doi/10.1145/3474085.3475673, Oct. 17, 2021, 6 Pages.

Wikipedia: "Eye Tracking", Wikipedia The Free Encyclopedia, retrieved from https://en.wikipedia.org/wiki/Eye_tracking, on Aug. 21, 2024, 23 Pages.

YouTube, The Wall Street Journal, "Behind the Eye-Tracking Tech That Could Help Apple's New Headset Work", https://www.youtube.com/watch?v=JBz_VB26pUg, Oct. 6, 2023, 3 Pages.

Zehra N., "How Eye Tracking Can Help You With Website Optimization?", VWO Blog, https://vwo.com/blog/eye-tracking-website-optimization/, May 22, 2024, 19 Pages.

Zhu Z., et al., "Adaptive Resolution Enhancement for Visual Attention Regions Based on Spatial Interpolation", MDPI, Sensors, vol. 23, No. 14, 6354, https://www.mdpi.com/1424-8220/23/14/6354, Jul. 13, 2023, 16 Pages.

* cited by examiner

610 OBTAIN ONE OR MORE VIDEO STREAMS FROM ONE OR MORE COMPUTING DEVICES AND DISPLAYING THE ONE OR MORE VIDEO STREAMS ON A DISPLAY DEVICE

620 ACQUIRE A LAYOUT OF THE DISPLAYED ONE OR MORE VIDEO STREAMS AND A POSITION AT WHICH EACH OF THE ONE OR MORE VIDEO STREAMS IS TO BE DISPLAYED IN THE LAYOUT

630 OBTAIN, VIA AN EYE-TRACKING MODULE, A LOCATION, A DURATION AND A FREQUENCY OF EYE-GAZE OF A USER ASSOCIATED TO THE DISPLAY DEVICE

640 IDENTIFY A FIRST POSITION IN THE LAYOUT THAT MATCHES THE LOCATION OF EYE-GAZE OF THE USER

650 COMPARE THE CORRESPONDING FREQUENCY OF EYE-GAZE TO A THRESHOLD VALUE

655 DETERMINE IF THE FREQUENCY OF EYE-GAZE IS HIGHER THAN THE THRESHOLD VALUE

YES

660 PIN THE AT LEAST ONE OF THE ONE OR MORE VIDEO STREAMS THAT CORRESPONDS TO THE FIRST POSITION TO THE LAYOUT

NO

670 UN-PIN THE AT LEAST ONE PINNED VIDEO STREAM FROM THE LAYOUT

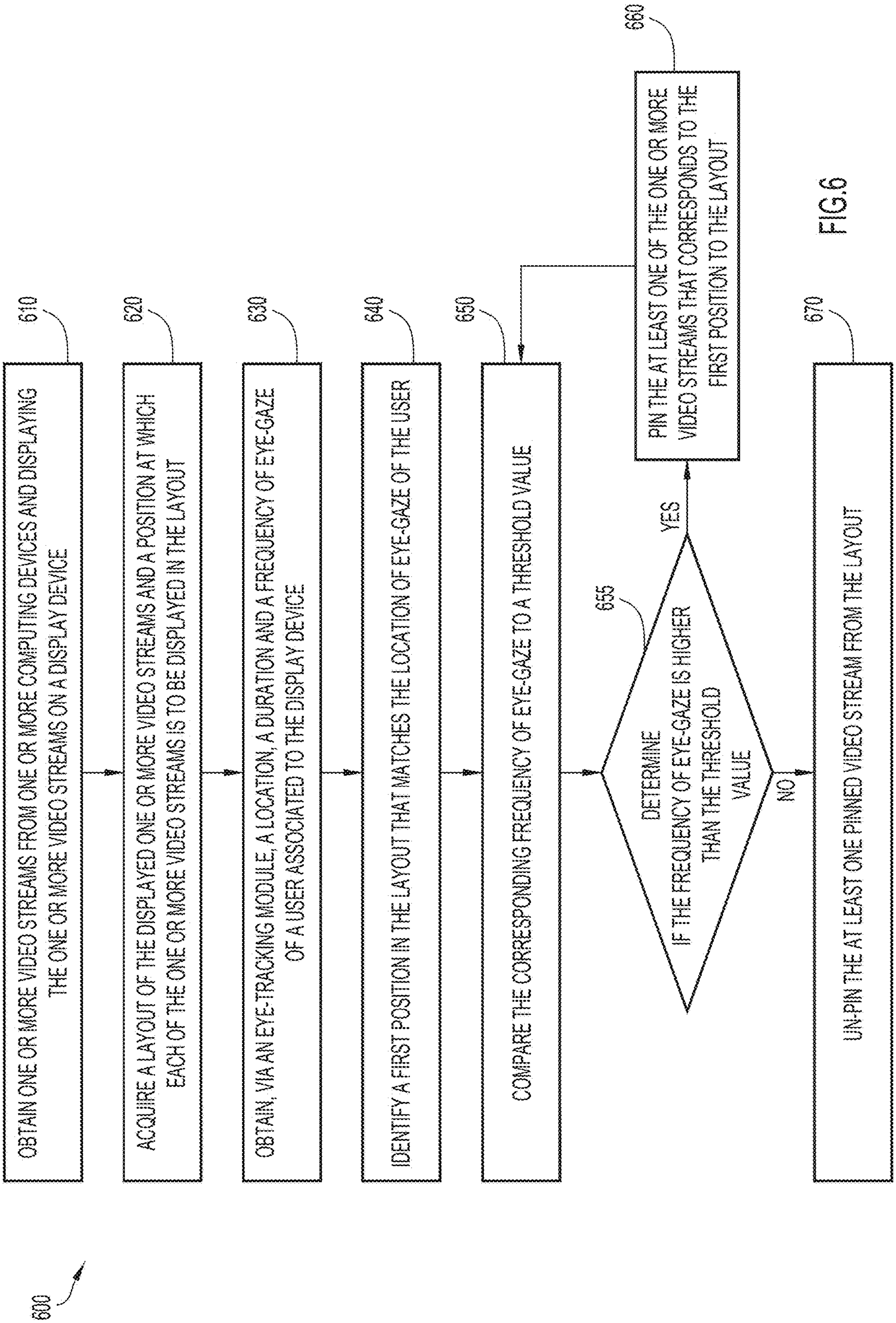

FIG.6

USING EYE TRACKING FOR SUPER RESOLUTION

TECHNICAL FIELD

The present disclosure relates to applying super-resolution to videos, and more specifically, to enabling super-resolution and improving quality of videos in online meetings by using eye-tracking information.

BACKGROUND

Participants of conference sessions, such as online team meetings, may share their real-time videos. The quality of the videos of all participants received by a participant may be deficient. Super-resolution is widely applied to compensate for received video quality. Considering cases where multiple videos are received in a conference session, applying super-resolution to each video is resource intensive. Generally, to avoid the burden on the resources, super-resolution is only applied to an active speaker in the conference session with the assumption that the active speaker of the meeting is always the person being looked at by all participants. However, this may not always be true.

BRIEF DESCRIPTION OF THE DRAWINGS

FIG. 6 is a flow chart depicting a method for enabling pinning and/or un-pinning of a video or shared content, according to an example embodiment.

DETAILED DESCRIPTION

Overview

Figure 1:
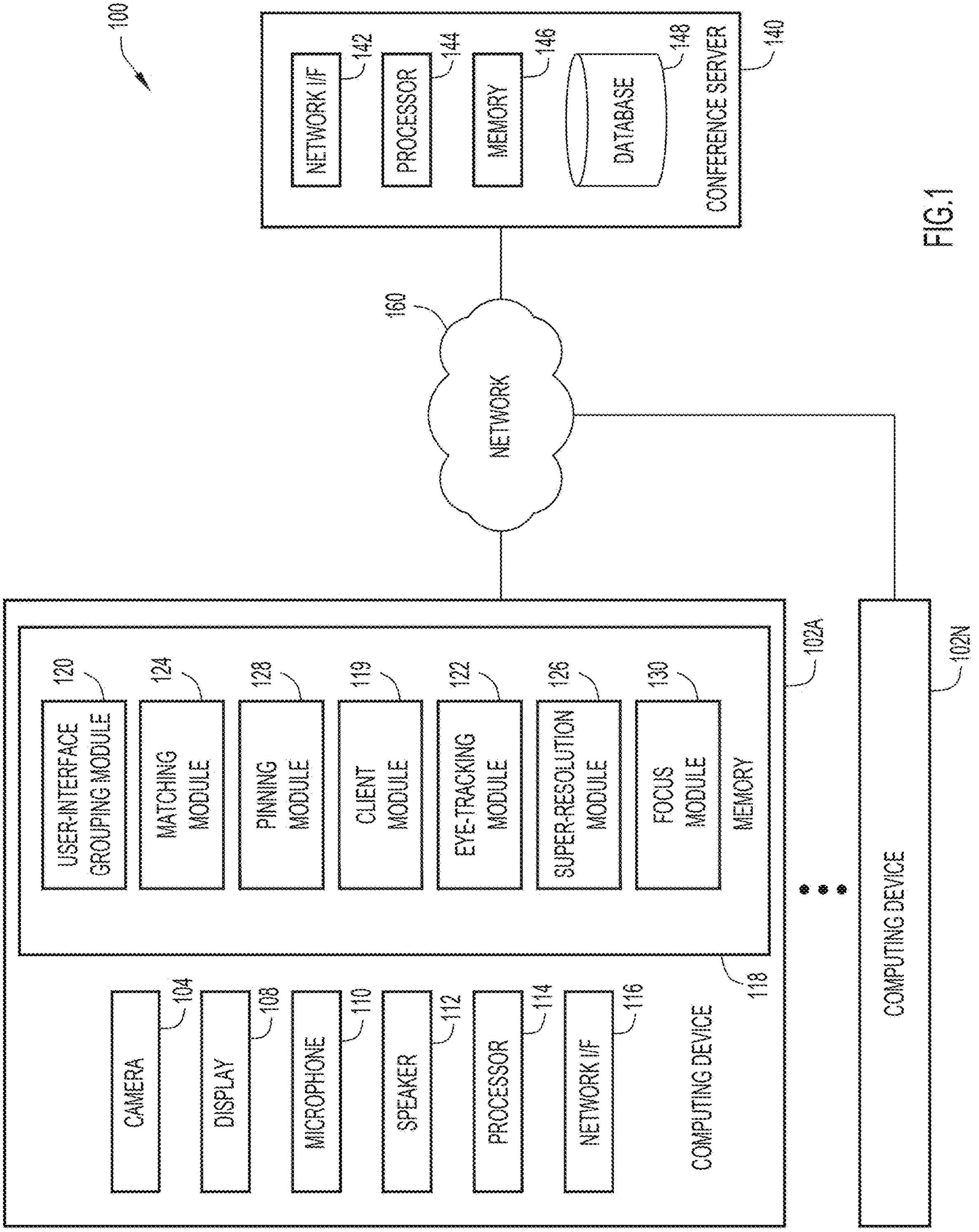
FIG. 1 is a block diagram depicting a system for applying super-resolution to videos in an online meeting, according to an example embodiment.

According to one embodiment, methods are provided for applying super-resolution to video or shared content that a user gazes at for a considerable time. One or more video streams are obtained from one or more computing devices and are displayed on a display device. A layout of the displayed one or more video streams and a position at which each of the one or more video streams is displayed in the layout are acquired. The location, duration, and frequency of eye-gaze of a user associated to the display device are obtained, via an eye-tracking module. A first position in the layout is identified that matches the location of eye-gaze of the user and the duration of eye-gaze of the user is compared to a first threshold time. Super-resolution is applied to at least one of the one or more video streams that corresponds to the first position when the duration of eye-gaze is longer than the first threshold time.

Example Embodiments

Embodiments are presented herein for video processing, and more specifically, to arrangements for applying super-resolution on videos of an online conference session using eye-tracking information of the participants of the online conference session.

A video conference system enables audio and video communication between computing devices. During real-time audio and video communication, participants may choose to share their video or share content displayed on their computing devices. For every participant receiving the videos of other participants and/or content shared by at least one participant on a computing device, the quality of the received video/content may experience a drop in the video quality due to network and/or bandwidth issues on the receiving end. To improve the quality of the display including the videos received and/or the content shared, super-resolution may be applied.

However, conventional techniques adapted for applying super-resolution to online conference sessions involves applying super-resolution to all videos received in the online conference session. The computing device that is on the receiving end of the videos of the online conference session may not have the resources required for applying super-resolution to all the videos received in the online conference session. Moreover, there is a concern for video processing related to power requirements. To overcome these issues, another technique that may be adapted by the computing device is selectively applying super-resolution to the video of the active speaker or to the content shared by a participant. In this technique, it is assumed that all the participants are looking at the active speaker or the content shared by a participant at all times. This may not always be true. A participant may be looking at videos of different participants at different times. Even when content is shared by a participant, another participant may or may not be looking at the shared content continuously but may also be looking at the active speaker, for example.

Accordingly, embodiments are presented herein that enable applying super-resolution to a video that is being looked at by the participant for a period of time. Over time, as the participant shifts gaze to another video or to the content being shared for a considerable amount of time, then super-resolution is applied to that video or shared content. In the embodiments presented herein, eye-tracking information of the participant is obtained, to match eye-tracking center point with an online meeting layout panel on a display of a computing device, so as to apply super-resolution to the video that the participant looks at in real-time. As eye-tracking center changes over time, the corresponding targeted video for applying super-resolution also changes, ensuring that everywhere the participant gazes at, in real-time, will have the best quality video. Thus, the embodiments that are presented herein provide the practical, more accurate and resource-friendly application of super-resolution during video communication sessions. The embodiments that are presented herein also provide more intelligence in changing video layouts, thus better aligning with the user's attention.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description, and appended claims, or may be learned by the practice of embodiments as set forth hereinafter.

Embodiments will now be described in detail with reference to the Figures. FIG. 1 is a block diagram depicting a video conference system (or "system") 100 to enable video and audio communication, such as an online meeting, in accordance with an example embodiment. Online meetings may include sharing of videos and audios, or sharing data presented on a display screen such as, text, and/or images. As depicted, system 100 includes one or more computing devices 102A-102N, a conference server 140, and a network 160. It is to be understood that the functional division among components of system 100 has been chosen for the purposes of explaining various embodiments and is not to be construed as a limiting example.

Computing devices 102A-102N each include a camera 104, a display 108, a microphone 110, a speaker 112, at least one processor 114, a network interface (I/F) 116, and a memory 118 that includes software instructions for a user-interface grouping module 120, an eye-tracking module 122, a matching module 124, a super-resolution module 126, a pining module 128 and a focus module 130. At least one of the computing devices, such as computing device 102A, may be a desktop (personal) endpoint device, a laptop computer, a tablet computer, a netbook computer, a desktop computer, a personal digital assistant (PDA), a smart phone, or a room video conferencing computing device.

Network interface 116 may include one or more network interface cards that enable the computing device 102A to send and receive data over a network, such as network 160. In general, a user of any computing device of computing devices 102A-102N may initiate and/or conduct video conference sessions with other participants, such as a user of another computing device, during which the user may share a video and/or audio or contents of the display of the computing device, including text and/or image.

Display 108 may include any electronic visual display or screen capable of presenting information in a visual form. For example, display 108 may be an LCD, LED display, an electronic ink display, a touchscreen, and the like. Display 108 may present a graphical user interface that includes interface elements for the display of information related to initiating a conference session, conducting a conference session, and/or providing a video and/or data, having a super-resolution or a higher resolution, during an online meeting or a conference session. During a conference session, still and/or video image data of one or more conference session participants may be presented to a user of any computing device 102A-102N via display 108.

Microphone 110 may include any transducer capable of converting sound to an electrical signal, and speaker 112 may include any transducer capable of converting an electrical signal to sound. Together, microphone 110 and speaker 112 can support bidirectional audio communication between a local user (i.e., a conference session participant local to any of computing devices 102A-102N) and a remote participant (e.g., a user local to another computing device 102A-102N or other device).

Camera 104 may include any conventional or other image capture device capable of still and/or video data. The camera 104 may be operated/controlled by one or more software modules of memory 118. The camera 104 may include hardware elements to enable the adjustment of the camera's settings, including focal length, angle of view, aperture size, and the like. Camera 104 may capture video of the user of the computing device 102A while participating in a conference session.

Client module 119, user-interface grouping module 120, eye-tracking module 122, matching module 124, super-resolution module 126, pinning module 128, and focus module 130 may be arranged to cooperate and perform various functions of the embodiments described below. Client module 119, user-interface grouping module 120, eye-tracking module 122, matching module 124, super-resolution module 126, pinning module 128, and focus module 130 may be implemented by any combination of any quantity of software and/or hardware modules or units and may reside within memory 118 of any computing devices 102A-102N for execution by a processor, such as processor 114.

Client module 119 may acquire the videos or the shared content at the computing device 102A. Client module 119 may be video-conferencing software installed on computing device 102A. A user of computing device 102A connects with other participants of a conference session or the audio and video communication session, through client module 119. Client module 119 generally includes a conference (online meeting) window that is displayed on the display 108 of the computing device 102A and may also be connected to camera 104, microphone 110, and speaker 112 of the computing device 102A. Client module 119 may arrange the received videos and the shared content in a grid view panel or a stack view panel in the conference window displayed on the computing device 102A, and provide and/or store a location of each video and/or shared content in the panel, irrespective of the arrangement of the videos and shared content.

User-interface grouping module 120 may initially process the videos and/or content received, at client module 119 of the computing device 102A, from other participants of an audio and video communication session. User-interface grouping module 120 may associate the received videos of participants to the participants of the audio and video communication session or their participant IDs. User-interface grouping module 120 may associate the received shared content to a participant of the audio and video communication session or the participant's ID. User-interface grouping module 120 may also apply perception artificial intelligence (AI) to each video and/or the shared content. Perception AI generally involves interpretation of the data received as videos or shared content. Perception AI of the user-interface grouping module 120 associates a position of a video and/or shared content to a participant of the audio and video conference session.

Eye-tracking module 122 monitors the eye status of the user of the computing device 102A. With the development of eye-tracking technology, such as wearable devices, dual cameras, or artificial intelligence, it is possible to obtain unbiased information of eye gazing on a given user interface panel, such as the display 108 herein. The user of the computing device 102A may be looking at a video of one of the participants on display 108 for a considerable amount of time. Alternatively, the user of the computing device 102A may be looking at the shared content for a considerable amount of time. Eye-tracking module 122 monitors the eye status of the user and provides data including, but not limited to, a location of the user's eye-gaze on display 108 of the computing device 102A and a duration of the user's eye-gaze at the associated location. The location of the user's eye-gaze is identified with respect to a position on the user interface panel of display 108. Eye-tracking module 122 may obtain the eye-tracking information locally with the user's permission.

Matching module 124 processes the data received from eye-tracking module 122 and the user-interface grouping module 120. Matching module 124 may generate a position of center point of the user's eye-gaze on display 108 associated to the data received from eye-tracking module 122. The center point of the user's eye-gaze may be used to pin-point or to otherwise identify a location that is used by the matching module 120 to match to the position of one of the videos of the participants or the shared content that is provided by the user-interface grouping module 120. The matching module 124 provides the duration of the user's eye-gaze (received from the eye-tracking module 122) in addition to the location of a video or shared content that the user is looking at.

Super-resolution module 126 is configured to apply super-resolution to the video and/or shared content that the user is looking at for a considerable amount of time. Super-resolution module 126 is arranged to process the duration of the user's eye-gaze associated to every location of video or shared content received from the matching module 124. Super-resolution module 126 includes threshold time value for the duration of eye-gaze. When a user gazes at a particular video of a participant or shared content for a duration longer than the threshold time value, super-resolution is applied to the corresponding video of the participant or the shared content by the super-resolution module 126. If the duration of eye-gaze is shorter than the threshold time value, super-resolution is not applied. Over time, as the user changes gaze and the duration of eye-gaze is now shorter than the threshold time value, super-resolution is disabled for the corresponding video of the participant or the shared content by the super-resolution module 126.

Pinning module 128 receives data from the matching module 124. In addition to the location and duration of eye-gaze of the user, the frequency of eye-gaze is also generated by the eye-tracking module 122 and provided to the matching module 124. Pinning module 128 may compare the frequency of the eye-gaze to threshold frequency values. Pinning module 128 may enable pinning of a participant video or shared content to the panel of the conference session window when the frequency off eye-gaze is higher than a threshold frequency value in addition the duration of eye-gaze being longer than the threshold time value. Pinning module 128 may further communicate with the super-resolution module 126 to enable super-resolution at the pinned video or shared/content. Pinning module 128 may disable pinning of the participant video or shared content from the panel of the conference session window when the frequency of eye-gaze is lower than the threshold frequency value.

Focus module 130 receives data from the matching module 124. Focus module 128 may compare the duration of the eye-gaze to threshold focus values. Focus module 130 may enable "people focus" to zoom into the humans in the video of the participants or "content focus" to zoom into texts or images in the shared content when duration of user's eye-gaze is longer than threshold focus value. Alternately, focus module 130 may enable expanding a size of the zoomed video. Expanding the size of the zoomed video may include, but is not limited to including, decreasing the size of other videos to accommodate the expanded size of the zoomed video, and/or causing the zoomed video to substantially cover or otherwise obscure parts of other videos. Focus module 130 may further communicate with the super-resolution module 126 to enable super-resolution at the zoomed video or shared/content. Focus module 130 may disable zooming into the participant video or shared content and/or expanding the zoomed video when the duration of eye-gaze is lower than the focus threshold value. The threshold value including, the threshold time value, threshold frequency value and the threshold focus value may be obtained over time and stored in a memory, such as memory 118.

Conference server 140 includes a network interface (I/F) 142, at least one processor 144, a memory 146, and a database 148. Conference server 140 may include a rack-mounted server, or any other programmable electronic device capable of executing computer readable program instructions. Network interface 142 enables components of conference server 140 to send and receive data over a network, such as network 160. In general, conference server 140 enables user devices, such as computing devices 102A-102N, to establish and conduct a conference session.

Database 148 may include any non-volatile storage media known in the art. For example, database 148 can be implemented with a tape library, optical library, one or more independent hard disk drives, or multiple hard disk drives in a redundant array of independent disks (RAID). Similarly, data in database 148 may conform to any suitable storage architecture known in the art, such as a file, a relational database, an object-oriented database, and/or one or more tables. Database 148 may store data including data or metadata relating to hosting conference sessions in which optically blurred background is provided in accordance with presented embodiments.

Network 160 may include a local area network (LAN), a wide area network (WAN) such as the Internet, or a combination of the two, and includes wired, wireless, or fiber optic connections. In general, network 160 can be any combination of connections and protocols known in the art that will support communications between computing devices 102A-102N and/or conference server 140 via their respective network interfaces in accordance with the described embodiments.

Figure 2:
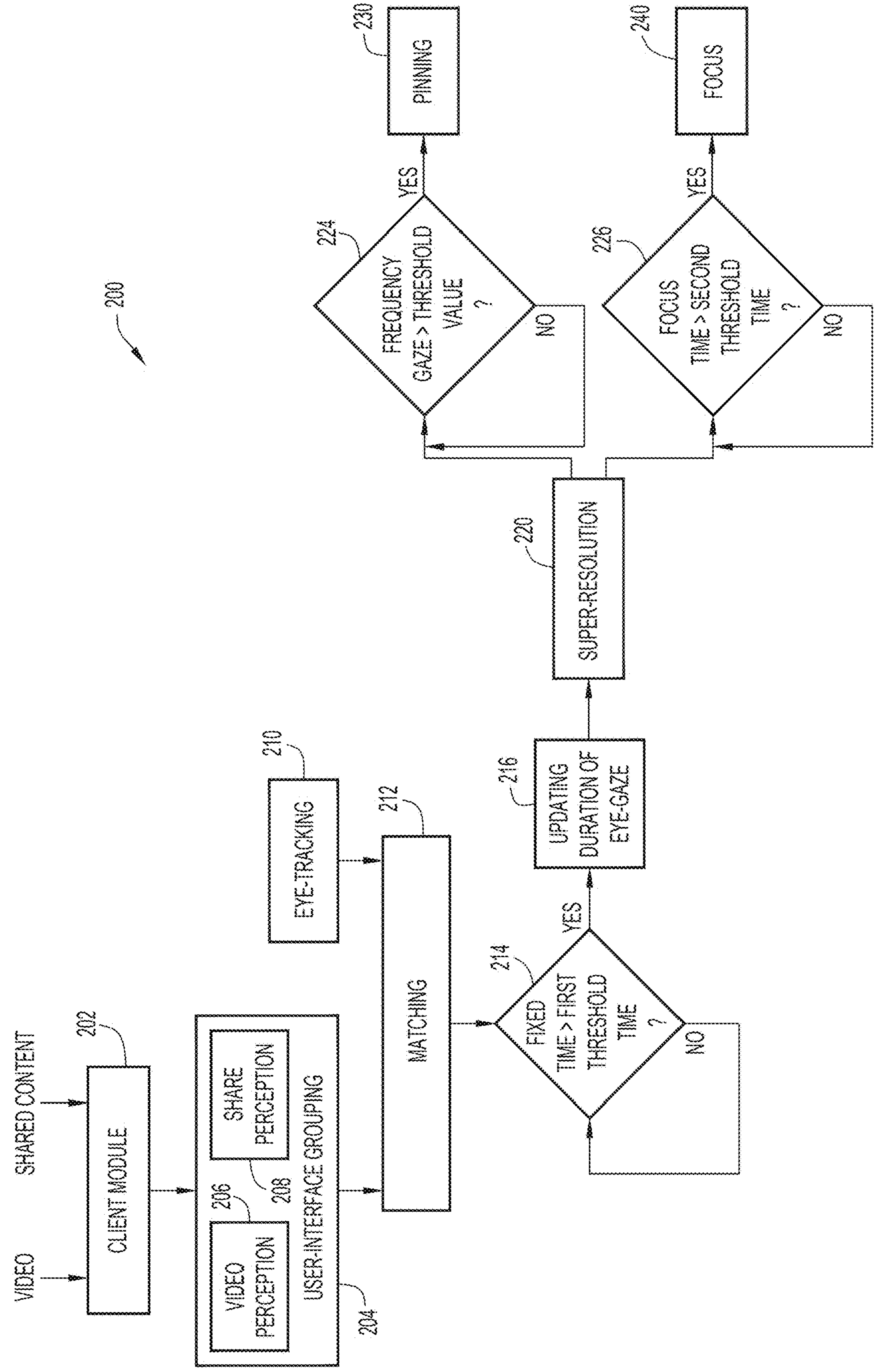
FIG. 2 is a block diagram depicting an operational flow for applying super-resolution using eye-tracking information incorporating the system of FIG. 1, according to an example embodiment.

Turning now to FIG. 2, FIG. 2 is a block diagram illustrating an operational flow 200 for applying super-resolution to a video or shared content using eye-tracking information during an audio and video communication session, in accordance with an example embodiment. Additionally, operational flow 200 may be implemented for pinning or zooming-into a video or shared content during an audio and video communication session, in accordance with an example embodiment. Operational flow 200 may be an example of execution of the software instructions stored in memory 118 by processor 114 of the computing device 102A of FIG. 1. Processor 114 of FIG. 1 may execute software instructions using client module 119, user-interface grouping module 120, eye-tracking module 122, matching module 124, super-resolution module 126, pinning module 128, and focus module 130 of memory 118 of FIG. 1.

Operational flow 200 begins with client module operation 202 obtaining video(s) and/or shared content. For example, computing device 102A of FIG. 1 obtains video of one or more participants and/or shared content from one participant at a time during the audio and video communication session from the respective computing devices of the attendees over a network (such as network 160 of FIG. 1). The video(s) and/or shared content is initially processed by client module operation 202. It is to be noted that the analog data of the video(s) and/or the shared content may have been converted to digital data by processor 114 and stored in memory 118 of FIG. 1 for further processing, such as operational flow 200.

Client module operation 202 arranges the video(s) and/or the shared content for viewing in a client module panel (also referred to as panel, hereafter). In particular, during the audio and video communication session, a user of the computing device may view the video(s) and/or the shared content arranged in a grid view or a stack view in the panel. For example, refer to FIG. 3A and FIG. 3B, schematic diagrams illustrating a user 300 in front of a computing device 302 (similar to the computing device 102A of FIG. 1). User 300 is an attendee of the audio and video communication session who is gazing at videos of attendees and/or shared content on panel 304 during the audio and video communication session.

Client module operation 202 may associate each video and/or shared content with a position on the panel 304 and a video streaming ID. The video streaming ID associated with videos processed by client module operation 202 may be referenced as Vid. Similarly, the video streaming ID associated with shared content may be referenced as Sid. The position may be defined as an area of a rectangular box that a video or shared content occupies (i.e., is displayed in or otherwise presented in) in a panel, such as panel 304. The area of the rectangular box 308 may be defined using distances of the rectangular box 308 from the left edge (x) of the panel 304 and from the top edge (y) of the panel 304, width (w) and height (h) of the rectangular box 308, also defined generally as bounding box area. As such, the position/bounding box area associated with each video or shared content is defined in terms of [x, y, w, h]. For example, in FIG. 3A video of an attendee, "video1" is presented in a rectangular box 306. The position defined by client module operation 202 for "video1" associated with a video streaming ID Vid1 may be interpreted as [Vid1: x1, y1, w1, h1]. Similarly, the position defined by client module operation 202 for the shared content "share1" in rectangular box 308 (in FIG. 3B), associated with a video streaming ID Sid1 may be interpreted as [Sid1: x2, y2, w2, h2]. Client module operation 202 may be implemented by software instructions for the client module 119 shown in FIG. 1.

Moving to the next step of operational flow 200, user-interface grouping operation 204 is configured to acquire the video(s) and/or shared content with the associated position and video streaming ID (Vid and/or Sid) from client module operation 202. User-interface grouping operation 204, in accordance with the example embodiments, is performed by implementing a video perception unit 206 and a share perception unit 208. Video perception unit 206 may apply video perception artificial intelligence on each of the acquired videos. Video perception unit 206 may also perform face detection and/or feature detection using artificial intelligence techniques to recognize the presence of a person in the videos. Video perception unit 206 may assign a person ID (Pid) to each video once the presence of the person is detected.

Similar to the video perception unit 206, share perception unit 208 may apply share perception artificial intelligence on shared content acquired from client module operation 202. Share perception unit 208 may perform layout analysis of the shared content using artificial intelligence techniques to interpret what is included in the shared content. For example, the shared content may include text, image or a combination of text and image(s). Share perception unit 208 may assign a Text ID (Tid), an Image ID (Iid) or both depending on the shared content.

User-interface grouping operation 204 may add the information obtained from video perception unit 206 including the person ID and/or from share perception unit 208 including the Text ID and/or Image ID to the information obtained from the client module operation 202 including the position of the video(s) and/or shared content.

Additionally, user-interface grouping operation 204 may associate each video and/or shared content with a vector to represent duration for which the user may look at the respective video and/or shared content (discussed in detail under eye-tracking operation 210 below). Initially, the vector representing the duration of eye-gaze of a user may be an empty vector. However, as the audio and video communication session proceeds, the data in the vectors may be updated by adding new data next to the old data as a list. Generally, vectors allow the storage of more than one data value that enables substantially all data values to be positioned next to each other.

For example, video1 with video streaming ID Vid1 (assigned by client module operation 202) of a Person 1 with person ID Pid1 (provided by the video perception unit 206) may be interpreted as [Vid1-Pid1: x11, y11, w11, h11; vecDur11], shared content share1 with video streaming ID Sid1 (provided by client module operation 202) including text1 with Text ID Tid1 (provided by the share perception unit 208) may be interpreted as [Sid1-Tid1: x21, y21, w21, h21; vecDur21], and if the shared content includes image Image1 with Image ID Iid1 (provided by the share perception unit 208), Image1 with Imaged ID Iid1 may be interpreted as [Sid1-Iid1: x22, y22, w22, h22; vecDur22]. These interpretations generated by user-interface grouping operation 204 may be stored in a memory, such as memory 118. User-interface grouping operation 204 may be implemented by software instructions for the user-interface grouping module 120 shown in FIG. 1.

Eye-tracking operation 210 may be triggered to track the user's eye-gaze by processor 114 when the client module operation 202 obtains video(s) and/or shared content. Eye-tracking operation 210 may implement eye-tracking technology such as wearable devices, dual cameras, or artificial intelligence techniques to monitor the status of eye-gaze of a user in front of a computing device, such as user 300 in front of the computing device 302 in FIG. 3A (or FIG. 3B). Eye-tracking operation 210 generates data including a duration of an eye gaze (also referred as 'duration element') associated to a position element. The position element may represent co-ordinates of the one or more points on a panel, such as panel 304 in FIG. 3A (or FIG. 3B), that a user in an audio and video communication session may be gazing at. In an embodiment, the position element may represent the center points of eye-gaze of the user on the panel. For example, in FIG. 3A, user 300 is gazing at point A of panel 304.

Generally, the position element may be represented as [x, y] representing the position/center-point of eye-gaze of user, in terms of the distances from the left edge (x) and top edge (y) of the panel. The center-point of eye-gaze of user may be the eyesight center of the user on the panel. For example, point A in FIG. 3A may be associated with a position element (x3, y3), where x3 is the distance of point A from the left edge of panel 304 and y3 is the distance of point A from the top edge of panel 304. The duration of eye-gaze may be represented as a time value, for example, using "dur" including the duration (time) of how long the user gazed at the position [x, y]. Eye-tracking operation 210 may generate the output [x, y; dur] for every position/center-point of eye-gaze [x, y] that the user may be gazing at for duration "dur". The output of the eye-tracking operation 210 may be stored in a memory, such as memory 118 for further processing. Eye-tracking operation 210 may be implemented by software instructions for the eye-tracking module 122 shown in FIG. 1.

Figure 3A:
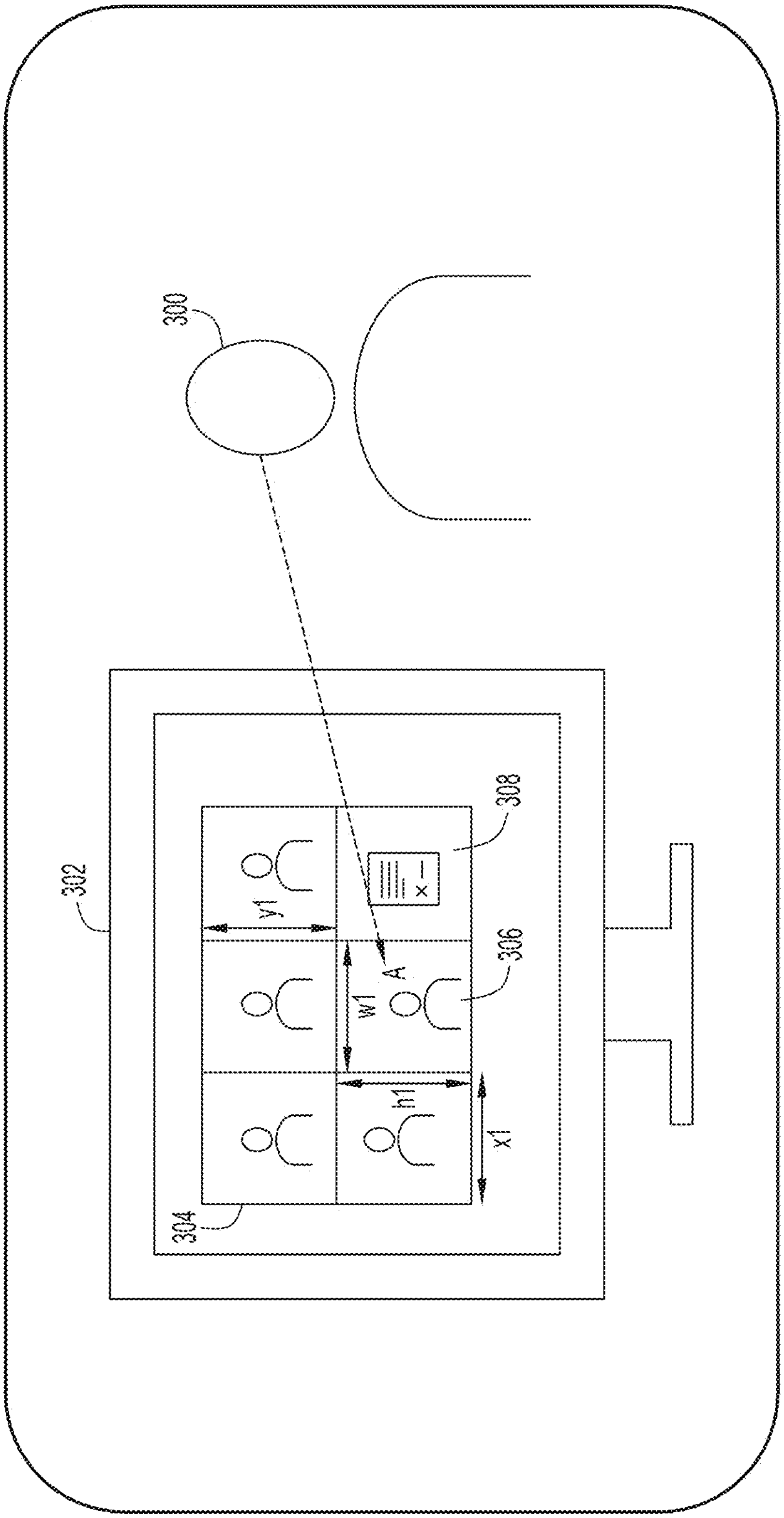
FIG. 3A is a schematic view depicting a user gazing at a video on a computing device, according to an example embodiment.

Matching operation 212 obtains the interpretations of each video and/or shared content generated by the user-interface grouping operation 204 in addition to duration of eye-gaze associated with positions of eye-gaze in a panel of audio and video communication session generated by the eye-tracking operation 210. For example, matching operation 212 may use [Vid1-Pid1: x11, y11, w11, h11; vecDur11] associated to Video1 from user-interface grouping operation 204 and (x3, y3), x3 associated to point A of eye-gaze from eye-tracking operation 210, as shown in FIG. 3A. Matching operation 212 is configured to compare the positions [x, y] of eye-gaze to the bounding box areas associated with the video streaming IDs including Vid and Sid. Additionally, matching operation 212 is configured to compare the positions [x, y] to the bounding box areas associated to Person IDs of the video(s) Pid, and/or Text ID Tid or Image ID Iid of the shared content. If a center-point of eye-gaze [x, y] falls into a bounding box area associated with Vid, Sid, Pid, Tid, or Iid, a match output is generated by the matching operation 212. The match output may be represented as [Mid-Xid: x, y, w, h; vecDur, dur], where Mid may be one of the Vid, Sid and Xid may be one of Pid, Tid, or Iid the center-point of eye-gaze [x, y] lies within the respective bounding box having a width w and height h.

In an example as shown in FIG. 3A, user 300 is gazing at a particular video1 of an attendee (Person 1 with person ID Pid1) in rectangular box 306 with bounding box area [Vid1: x1, y1, w1, h1] and center-point of eye-gaze A [x3, y3] of user 300 is within the bounding box area associated with rectangular box 306 in panel 304. The bounding box area associated with rectangular box 306 may be associated to a vector vecDur11 including previous eye-gaze duration, and the center-point of eye-gaze A [x3, y3] may be associated with a value "durA" of current eye-gaze duration. The match output generated by matching operation 212 for this example may be represented as [Vid1-Pid1: x3, y3, w1, h1; vecDur11, durA].

Figure 3B:
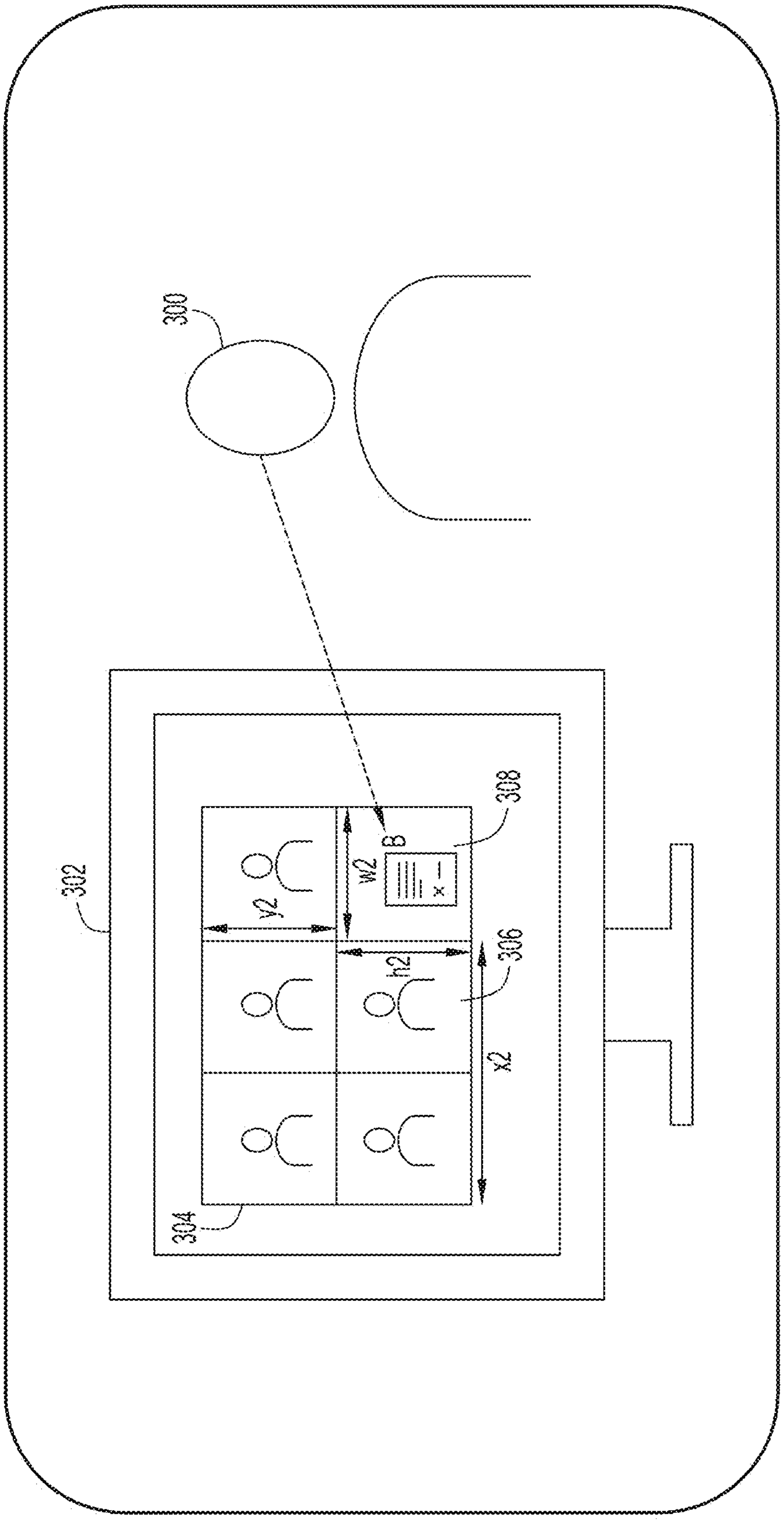
FIG. 3B is a schematic view depicting a user gazing at shared content on a computing device, according to an example embodiment.

In another example as shown in FIG. 3B, user 300 is gazing at shared content Sid1 including text with Text ID Tid1, in rectangular box 308 with bounding box area [Sid1: x2, y2, w2, h2] and center-point of eye-gaze B [x4, y4] of user 300 is within the bounding box area associated with rectangular box 308 in panel 304. The bounding box area associated with rectangular box 308 may be associated to a vector vecDur21 including previous eye-gaze duration, and the center-point of eye-gaze B [x4, y4] may be associated with a value "durB" of current eye-gaze duration. The match output generated by matching operation 212 for this example may be represented as [Sid1-Tid1: x4, y4, w2, h2; vecDur21, durB]. Matching operation 212 may be implemented by software instructions for the matching module 124 shown in FIG. 1

Memory 118 may store threshold values including a fixed-time (or a first threshold time), a focus-time (or a second threshold time), and a frequency. The threshold value of fixed-time may represent a time value for determining if the gaze of the user is actually fixed at a point or wandering around. For example, the threshold value of fixed-time may be beneficial to determine if the user is gazing at a video or shared content for a considerable amount of time (fixed-time), i.e., for about 1 second or more, or if the user is gazing at videos of more than one attendee of the audio and video communication session or the shared content for relatively short durations of time, i.e., for a few milliseconds.

Moving to step 214 in the operational flow 200, the value "dur" of the match output from the matching operation 212 associated to current eye-gaze duration of the participant is compared to the threshold value of fixed-time (or the first threshold value). If the value "dur" of the match output is greater than the threshold value of fixed-time, then super-resolution is applied to the video and/or shared content of the match output. The operational flow 200 moves to the next step 216 and then to the next step, super-resolution operation 220. For example, if a participant is gazing at a video and/or shared content for an amount of time defined by the threshold value of fixed-time, then the operational flow 200 moves to the next step 216.

At step 216, the value "dur" of current eye-gaze duration of the match output is copied to the vector vecDur associated with the video or shared content of the match output, resulting in updating vecDur with eye-gaze duration of the match outputs in every flow of the operational flow 200. Alternately, if the value "dur" of the match output is less than the threshold value of fixed-time, the operational flow 200 iterates in a loop and re-compares the value "dur" of the match output to the threshold value of fixed-time until a value "dur" associated with the eye-gaze of the participant is greater than the threshold value of fixed-time.

Super-resolution operation 220 applies primary super-resolution to the bounding box area associated with a video or shared content of the match output (primary super-resolution targeted videos) of the matching operation 212 for which the value "dur" is greater than the threshold value of fixed-time. For example, in FIG. 3A, super-resolution is applied to video in rectangular box 306 if the duration or eye-gaze associated to point A is greater than a threshold value of fixed-time. A higher resolution image (or video) has more pixels than a lower resolution image (or video) resulting in improved image quality, smoother gradients, crisper edges, and finer details. Super-resolution is a technique, generally applied to reconstruct an image (or video) to generate a higher resolution image (or video) by combining lower resolution and/or noisy sequence of the images (or videos). Super-resolution techniques may generally increase the resolution of an image (or video) by generating missing details from the lower resolution sequence of images (or videos). Super-resolution may be applied using computer-vision algorithms and/or image processing algorithms.

Additionally, super-resolution operation 220 may apply secondary super-resolution, i.e., super-resolution with a lower degree of resolution as compared to the primary resolution, to the bounding box areas (videos and/or shared content) neighboring (secondary super-resolution targeted videos) the bounding box area (video or shared content) of the match output. The neighboring bounding box areas may be the geometrical neighbors of the bounding box area of the match output. For example, if the primary super-resolution has a factor of resolution defined as 4× of the normal resolution x (resolution of the video and/or shared content as obtained from a sender), then the secondary super-resolution may have a factor of 3×, or 2× of normal resolution. By applying a difference in the factor of super-resolution between primary super-resolution targeted videos and secondary super-resolution targeted videos, there may be a smooth transition for human eye adaptation (for the user). Applying super-resolution operation 220 may be implemented by software instructions for the super-resolution module 126 shown in FIG. 1. It should be appreciated that, once super-resolution operation 220 is complete, steps 224 and 226 may occur substantially simultaneously.

The vector vecDur of the match output from matching operation 212 includes substantially all previous eye-gaze durations of the user in relation to the bounding box area of the match output. It is to be noted that a count of substantially all previous eye-gaze durations of the participant in relation to the same bounding box area may define how many times the participant's eye-gaze matched the same video or shared content, i.e., the frequency of eye-gaze for the said video or shared content. The threshold value of frequency stored in memory 118 may represent a frequency of gazing at a particular video or shared content that may be used in determining if the eye has frequently come back to the same area associated to the said video or shared content. The threshold value of frequency may be, for example, about 1-5 times of gazing at a particular video or shared content within 1 minute.

Moving to step 224 in the operational flow 200, the size of the vector vecDur, indicating the count of all previous eye-gaze durations stored in the vector vecDur, is compared to the threshold value of frequency. If the size of vector vecDur of the match output obtained from the matching operation 212 is greater than the threshold value of frequency, the operational flow 200 moves to the next step, pinning operation 230. Alternately, if the size of vector vecDur of the match output is less than the threshold value of frequency, the operational flow 200 iterates in a loop and re-compares the size of vector vecDur of the match output to the threshold value of frequency. For example, if a participant is gazing at a video or shared content very frequently then the operational flow 200 moves to the next step, pinning operation 230.

Pinning operation 230 is configured to pin a video or shared content to the panel (may also be referred to as stage) of the audio and video communication session. Pining allows a video or shared content to be visible to the participant at all times in scenarios where only some of the videos are presented in a stack view or grid view at a given time. Pinning operation 230 may trigger super-resolution operation 220 to apply consistent super-resolution to the pinned video or shared content. Furthermore, the threshold value of frequency may have a lower bound value, when the size of vector vecDur falls below the lower bound value, pinning operation 230 may un-pin the pinned video or shared content. Pinning operation 230 may be implemented by software instructions for the pinning module 128 shown in FIG. 1.

The threshold value of focus-time (or a second threshold time) may represent a time value for determining if the gaze of a participant at a place (position in panel incorporating the audio and video communication session) is considered to be relatively long. For example, the threshold value of focus-time may be beneficial to determine if a user (participant) is focusing on a video and/or shared content for a considerable amount of time (focus-time) i.e., for about 10 seconds or more. When it is determined that a user is focusing on a video and/or shared content for the considerable amount of time, it may be beneficial to zoom into the person in the video i.e., perform "people focus" or zoom into the texts/images in the shared content i.e., perform "content focus."

Moving to step 226 in the operational flow 200, the value "dur" of the match output from the matching operation 212 associated to current eye-gaze duration of the participant is compared to the threshold value of focus-time (or the second threshold time). If the value "dur" of the match output is greater than the threshold value of focus-time, the operational flow 200 moves to the next step, focus operation 240. Alternately, if the value "dur" of the match output is less than the threshold value of focus-time, the operational flow 200 iterates in a loop and re-compares the value "dur" of the match output to the threshold value of focus-time. For example, if a participant is focusing on a video or shared content for a considerable amount of time defined by the threshold value of focus-time e.g., about 10 seconds or more, then the operational flow 200 moves to the next step, focus operation 240.

Focus operation 240 is configured to zoom into a video or shared content of the audio and video communication session. Zoom-in allows a video or shared content to be visible more clearly, by the general definition of zooming, to the participant at all times in scenarios where the participant is trying to focus more on the person's face in a video or images and/or texts in shared content. Zoom-in may include the ability to expand a size of the video or shared content, for example, video or shared content of a speaker to emphasize that speaker. Focus operation 240 may expand the size of a particular video or shared content that the participant is focusing on, while the other videos in the grid view or stack view are decreased in size. Alternately, the focus operation 240 may expand the size of the particular video or shared content relative to the other videos covering parts of other videos, changing the layout making one video (or shared content) bigger than the other videos. Focus operation 240 may trigger super-resolution operation 220 to apply consistent super-resolution to the zoomed-in video or shared content. Furthermore, the threshold value of focus-time may have a lower bound value, when the vector vecDur falls below the lower bound value, focus operation 240 may zoom-out the video or shared content. Focus operation 240 may be implemented by software instructions for the focus module 130 shown in FIG. 1.

The threshold values provided as examples may not be based on precise implications. They are just empirical values applicable to the universal, based on which preferences may be added regarding the adjustment sensitivity.

Figure 4:
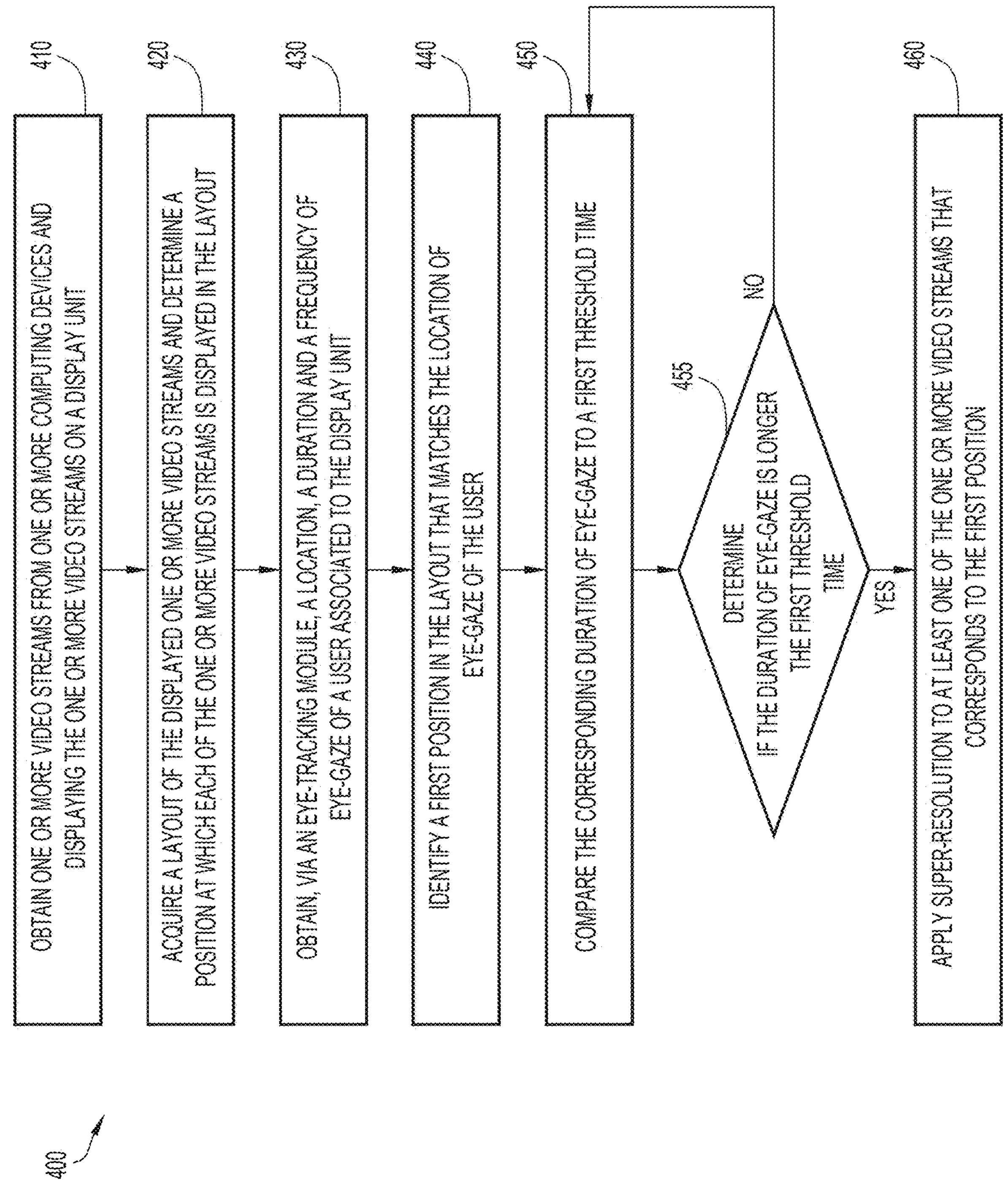
FIG. 4 is a flow chart depicting a method for applying super-resolution to a video or shared content, according to an example embodiment.

Turning now to FIG. 4, a flow chart depicting method 400 for applying super-resolution to a video or shared content utilizing eye-tracking technology is now described, according to an example embodiment.

A computing device may be used for an audio and video communication session, during which attendees of the communication session may share their videos and/or one attendee (at a time) may share content including text and/or images. A user of the computing device may be looking at or gazing at the videos and/or shared content from other attendees. In an example embodiment, the user may gaze at a particular video or shared content for a considerably long time, thereby resulting in the application of super-resolution to that video or shared content. On receiving the videos and/or shared content from other attendees, operations of the method 400 are initiated. The videos and/or shared content are generally received at the computing system as video streams.

One or more video streams shared by attendees from their computing systems may be obtained at a computing system of a user in operation 410. The obtained video streams may be provided to a processor and/or memory of the computing device. The processor may perform initial image processing operations and then provide the video streams to the memory. The memory may provide video streams including videos and/or shared content on a user-interface panel displayed on a display unit of the computing device for the user to look at. It is to be noted that the terms “user-interface panel,” “display unit” and “panel” may be used interchangeably throughout the text.

Operation 420 includes acquiring a layout of the video streams including videos and/or shared content on the display unit. Operation 420 may also include determining a position for each of the videos and/or shared content in the layout, further including bounding box areas for each of the videos and/or shared content in the layout. Video streaming IDs may also be assigned to each of the videos and/or shared content. Memory of the computing device may employ artificial intelligence-based perception techniques for face detection in the videos and/or layout analysis in the shared content, associating a person detected in the videos with a person ID, and text/image detected in the shared content with a text ID and/or an image ID. In other words, operation 420 determines a position relative to bounding box areas associated with a video streaming ID. Additionally, operation 420 determines at least one of a person ID, text ID, and/or image ID for the video streams including videos and/or shared content in the layout.

Memory of the computing device employs eye-tracking technology in operation 430. For a user gazing at the videos and/or the shared content on the display unit, a center-point of eye-gaze is determined on the display unit by employing eye-tracking technology. Center-point of eye-gaze is defined by a position i.e., location of the center-point on the display unit, and duration of eye-gaze. Eye-tracking technology determines the location of eye-gaze of the user on the display unit and duration of eye-gaze.

Operation 440 includes identifying a position (i.e., a first position in the layout) of the video and/or shared content that matches the position of eye-gaze of the user. In other words, operation 440 identifies video or shared content that the user is gazing at. It is to be appreciated that the position of eye-gaze may lie within a bounding box area defined for either a video or shared content.

Operation 450 includes determining if the duration of eye-gaze associated with the position of eye-gaze that matched with a video or shared content on the layout was for a relatively long duration or for a relatively short duration. Memory of the computing device includes stored threshold values, such as a fixed-time (also referred as first threshold time). Operation 450 includes comparing the duration of eye-gaze to the fixed-time. The fixed-time may vary widely.

Operation 455 determines if the duration of eye-gaze is longer than the fixed-time or not, i.e., if the user is gazing at a video or shared content for a relatively long duration or gazing at other videos and/or shared content for relatively short durations. Upon determining that the duration of eye-gaze is longer than the fixed-time, i.e., a user is gazing at a video or shared content for a considerable amount of time, method 400 moves to operation 460. On the other hand, if it is determined that the duration of eye-gaze is shorter than the threshold value of fixed-time, method 400 returns to operation 450.

Memory of the computing device applies super-resolution in operation 460. Super-resolution is primarily applied to the video or shared content that the user gazes at for a considerable amount of time or a relatively long duration, e.g., for a duration longer than a pre-determined threshold value (fixed-time). Operation 460 includes applying super-resolution to the video or shared content corresponding to the position identified in operation 440. As the user’s eye-gaze moves or otherwise changes to another video or shared content, operations of method 400 may continuously process the video streams acquired at a computing device and the duration and position of eye-gaze to apply super-resolution to a video or shared content, ensuring that everywhere the user looks will always have the best video quality.

In an aspect of the techniques presented herein, if the user-interface panel (displayed on a display unit) of the audio and video communication session is subject to a change, such as, for example due to a request to replace/resize the user-interface panel, then the positions of the video streams including video and/or shared content may be remapped. In this scenario, memory of the computing device may employ method 400, operations 420 onwards to take into consideration the remapped positions of the video streams displayed on the display unit.

Figure 5C:
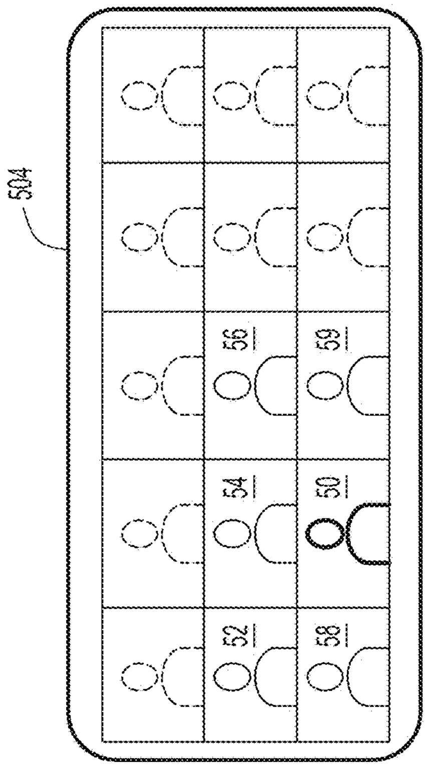
FIG. 5C is schematic diagram depicting an audio and video communication session with primary and secondary super-resolution applied to videos on a computing device, according to an example embodiment.
Figure 5A:
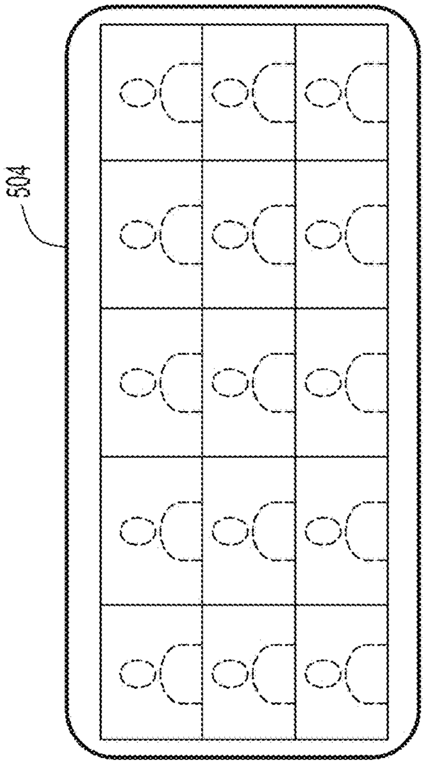
FIG. 5A is schematic diagram depicting videos of an audio and video communication session on a computing device, according to an example embodiment.
Figure 5B:
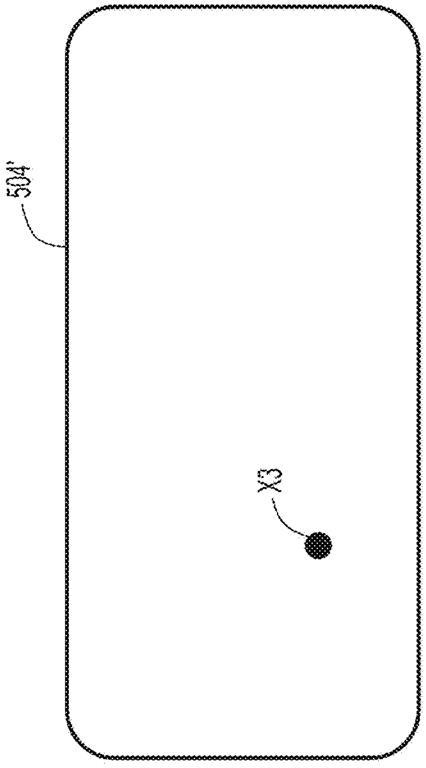
FIG. 5B is a schematic diagram depicting a center-point of eye-gaze of a user on a computing device, according to an example embodiment.

FIGS. 5A, 5B and 5C illustrate an example of the techniques presented herein, such as method 400 of FIG. 4. FIG. 5A illustrates panel 504 displaying an example audio and video communication session including videos and/or shared content displayed on a display unit of the computing device. Eye-tracking technology is employed as described in method 400, operation 430. FIG. 5B, illustrating panel 504'. is effectively panel 504 in FIG. 5A but shown to illustrate a result of eye-tracking technology. Point X3 as depicted on panel 504' represents a center-point of eye-gaze of a user in front of panel 504', and hence, panel 504. Eye-tracking technology also provides duration of eye-gaze of user associated to point X3.

Executing software instructions including operations 440 provides the corresponding video 50 in FIG. 5C, associated with the center-point of eye-gaze (point X3 in FIG. 5B). Video 50 may be the primary super-resolution-targeted video. Memory of the computing device further implements operations 450 and 455 to determine if the user gazes at the video 50 in FIG. 5C, for a considerable amount of time or relatively shorter duration. If the user gazes at the video 50 for a considerable amount of time i.e., longer than a threshold value of fixed-time, super-resolution is applied to video 50 as shown in FIG. 5C. It is to be noted that the videos shown in dotted lines (in FIG. 5A and FIG. 5C) represent videos of low-quality (as received from a sender) and videos with bold lines, such as video 50, represent videos to which super-resolution is applied.

In an aspect of the techniques presented herein, primary super-resolution may be applied to video 50, and secondary super-resolution may be applied to the videos that are geometrical neighbors of the primary super-resolution targeted video 50, including 52, 54, 56, 58 and 59. As noted, secondary super-resolution implements a resolution of lower degree as compared to the primary super-resolution. Geometrical neighbors of the primary super-resolution targeted video 50 are typically videos or shared content that are displayed adjacent to, or in relatively close proximity to, super-resolution targeted video 50.

In another aspect of the techniques presented herein, higher-resolution may be requested from the sender of a video, e.g., each attendee's computing device may be requested for a video or shared content with higher resolution over network 160. If sender is unable to send a video or shared content with higher resolution or if the videos received at a user's computing device are of lower resolution or low quality due to issues such as bandwidth limitation, super-resolution may be applied, in one embodiment, by implementing the operations as described in method 400.

Turning now to FIG. 6, a flow chart depicting method 600 for pinning a video or shared content utilizing eye-tracking technology is now described, according to an example embodiment.

In an example embodiment, a user may gaze at a video or shared content repeatedly for an amount of time. The user may want to see a video and/or shared content, not involving the active speaker, throughout the audio and video communication session which indicates that the particular video or shared content that is the subject of the user's gaze repeatedly may be preferably pinned to the user-interface panel. Pinning allows a user to choose which video stream (video of people or shared content) should be constantly provided for viewing. Upon receiving the videos and/or shared content from other attendees, operations of the method 600 are initiated at the user's computing device.

Operation 610 includes obtaining video streams from the computing devices of other attendees, for example, on a network, such as network 160 of FIG. 1. Video streams include videos and/or shared content from other attendees. Operation 610 further includes displaying the video streams on the display device. Operation 620 includes acquiring a layout of the video streams displayed on the display unit. Additionally, operation 620 includes acquiring positions or bounding box areas of individual video streams displayed on the display unit. Techniques described for method 400, operations 410 to 440, are similarly applicable to techniques described for method 600, operations 610 to 640.

Operation 630 includes the memory of the computing device employing eye-tracking techniques. Eye-tracking techniques implemented for method 600 provide a frequency of eye-gaze in addition to duration of eye-gaze and position of eye-gaze. In other words, operation 630 includes providing information regarding the number of times (i.e., frequency of eye-gaze) a user repeatedly gazed at a particular location on the display unit (i.e., position of eye-gaze), in addition to the duration of eye-gaze.

Operation 640 includes identifying a first position corresponding to a video or shared content that matches the location of eye-gaze of the user. It is to be noted that the position of eye-gaze lies within a bounding box area of a video or shared content that the user is gazing repeatedly at. Operation 650 includes comparing the frequency of eye-gaze corresponding to the first position identified in operation 640, to a threshold value stored in memory.

It is to be noted that, for a video or shared content to be pinned to the display unit (or user-interface panel) for the user to continuously look at that video or shared content, a check is typically performed. Memory of the computing device stores a threshold value corresponding to a frequency count. Operation 655 includes performing the check, i.e., determining if a frequency of eye-gaze is higher than the threshold value. If the frequency of eye-gaze is higher than the threshold value, then method 600 moves from operation 655 to operation 660.

Memory may save two threshold values, including an upper bound threshold value and a lower bound threshold value. Additionally, the information obtained from operation 630 may be locally recorded at the computing device, over time. This may be helpful to rank the videos and/or shared content based on the total time each video and/or shared content has been looked at by the user. If the total time reaches beyond the upper bound threshold value for a particular video and/or shared content, the particular video and/or shared content may be pinned to the panel, and if the total time falls below the lower bound threshold value, pinned videos may be unpinned. Moreover, if there are more videos on hidden panels, the unpinned video may be sent to the hidden panels and a hidden video may be provided for viewing on the display unit. The upper and lower bound values may be obtained over a period of time.

Operation 660 includes pinning the video and/or shared content corresponding to the first position identified in operation 640, or to a fixed location on the display unit. Method 600 then moves to operation 650 for continuous comparison with the threshold value. Operation 655 is again performed to check if the user is repeatedly gazing at the video or shared content. If the frequency of eye-gaze is now lower than the threshold value, then method 600 moves from operation 655 to operation 670. Operation 670 includes un-pinning the pinned video or shared content, when a user is not repeatedly gazing at that particular video or shared content anymore.

Operation 660 may also include applying super-resolution to the pinned video or shared content. As the user's repeated eye-gaze changes to another video or shared content, operations of method 600 may continuously process the video streams acquired at a computing device and the frequency, duration, and position of eye-gaze to pin or apply super-resolution to a video or shared content.

Figure 7A:
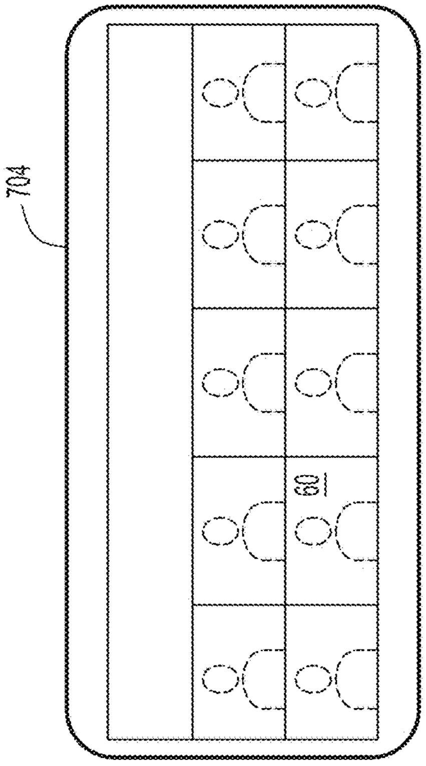
FIG. 7A is schematic diagram depicting videos of an audio and video communication session on a computing device, according to an example embodiment.
Figure 7B:
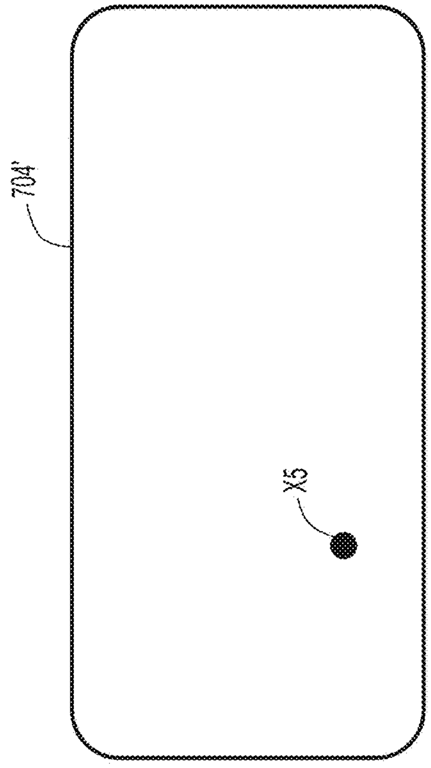
FIG. 7B is a schematic diagram depicting a center-point of eye-gaze of a user on a computing device, according to an example embodiment.
Figure 7C:
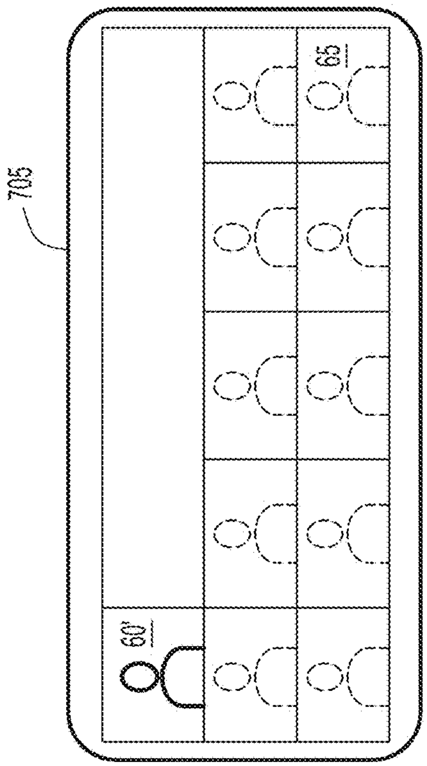
FIG. 7C is schematic diagram depicting an audio and video communication session with pinning enabled for a video on a computing device, according to an example embodiment

Referring now to FIGS. 7A, 7B, and 7C, an example of the techniques presented herein is illustrated, such as techniques described with respect to method 600 of FIG. 6. FIG. 7A illustrates panel 704 displaying an example audio and video communication session including videos and/or shared content displayed on a display unit of the computing device. Eye-tracking technology is employed as described in method 600, operation 630. Consider FIG. 7B, illustrating panel 704'. It is to be noted that panel 704' in FIG. 7B is same as panel 704 in FIG. 7A, FIG. 7B is illustrating the result of eye-tracking technology.

Point X5 in FIG. 7B, on panel 704' represents a center-point of eye-gaze of a user in front of panel 704' (or 704). Eye-tracking technology also provides frequency of eye-gaze of user associated to point X5. Video 60 of FIG. 7A is identified to be corresponding to point X5 of FIG. 7B using the location of point X5 on the panel 704' and the bounding box area of video 60 on panel 704 by executing software instructions including operations 640.

Memory of the computing device further implements operations 650 and 655 to determine if the user gazes at the video 60 in FIG. 7A, repeatedly. If the user gazes at the video 60 repeatedly i.e., higher number of times than a threshold value of frequency, the video is pinned to the panel, as shown by pinning the video 60' to panel 705 as shown in FIG. 7C. In an aspect of the techniques presented herein, super-resolution may also be applied to pinned video 60'. As pinning occurs, the videos in panel 705 get reshuffled and a video 65 from a hidden panel may now be available for viewing in panel 705. It is to be noted that the videos shown in dotted lines (in FIG. 7A and FIG. 7C) represent videos of low-quality (as received from a sender) and videos with bold lines, such as video 50, represent videos to which super-resolution is applied.

Figure 8:
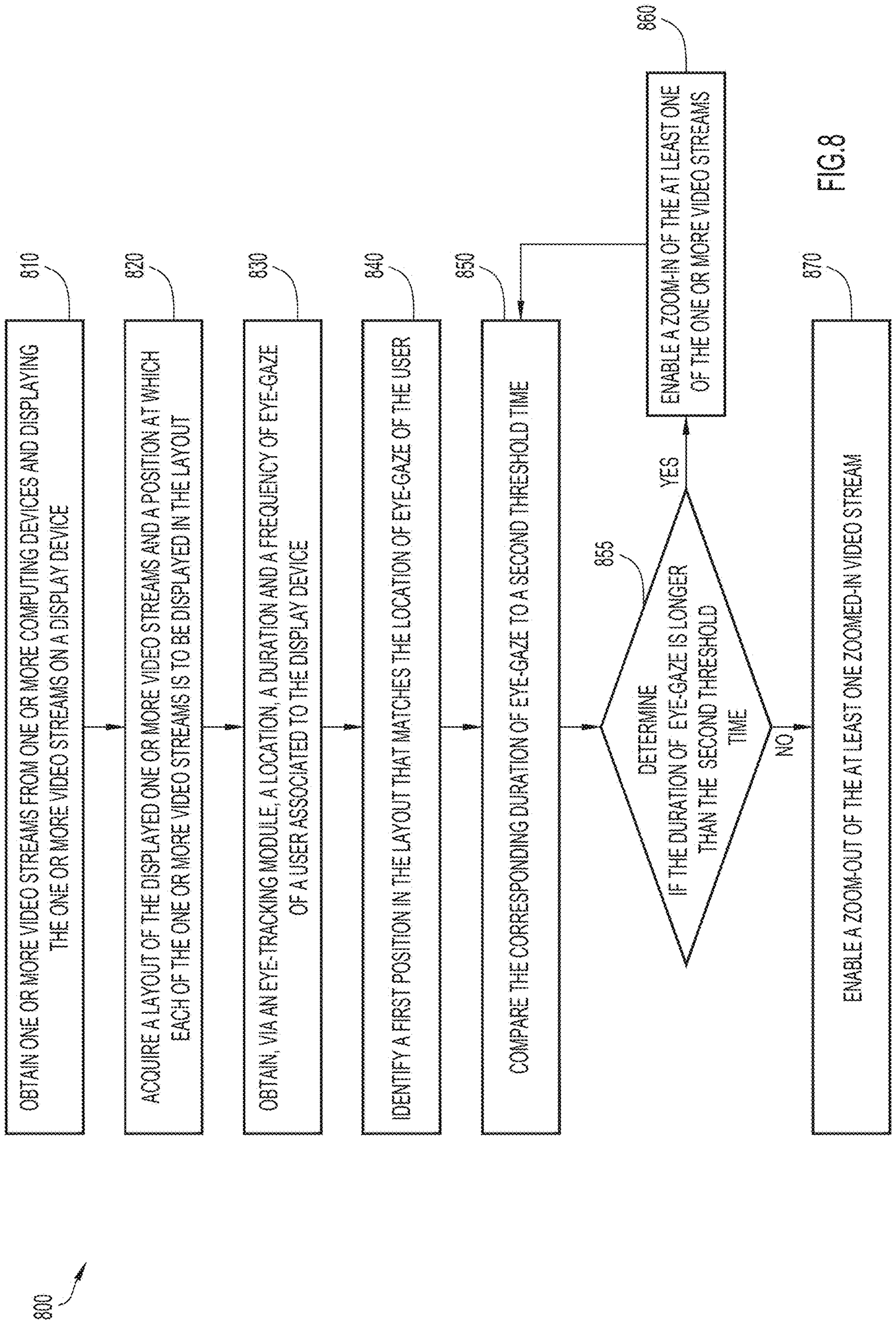
FIG. 8 is a flow chart depicting a method for performing people focus or content focus on a video or shared content, according to an example embodiment.

Turning now to FIG. 8, a flow chart depicting method 800 for employing zoom-in of a video or shared content utilizing eye-tracking technology is now described, according to an example embodiment.

In an example embodiment, a user may gaze at a video or shared content for a considerably long time requiring focusing on that particular video or shared content. Focusing includes "people focus" to zoom into the humans in the video of the attendees or "content focus" to zoom into texts or images in the shared content when duration of user's eye-gaze is longer than threshold value or focus-time (or a second threshold time). It is to be noted that the second threshold time (focus-time) may be longer than the first threshold time (fixed-time).

On receiving the videos and/or shared content from other attendees, operations of method 800 are initiated at the user's computing device.

Operation 810 includes obtaining video streams from the computing devices of other attendees, for example, on a network, such as network 160 of FIG. 1. Video streams include videos and/or shared content from other attendees. Operation 810 further includes displaying the video streams on the display device. Operation 820 includes acquiring a layout of the video streams displayed on the display unit. Additionally, operation 820 includes acquiring positions or bounding box areas of individual video streams displayed on the display unit. Techniques described for method 400, operations 410 to 440, are similarly applicable to techniques described for method 800, operations 810 to 840.

Operation 830 includes the memory of the computing device employing eye-tracking techniques. Eye-tracking techniques implemented by method 800 provide a duration of eye-gaze and position of eye-gaze. In other words, operation 830 includes providing information regarding the time (duration of eye-gaze) that a user gazed at a particular location on the display unit (i.e., position of eye-gaze), in addition to the duration of eye-gaze.

Operation 840 includes identifying a first position corresponding to a video or shared content that matches the location of eye-gaze of the user. It is to be noted that the position of eye-gaze lies within a bounding box area of a video or shared content that the user is gazing at. Operation 850 includes comparing the duration of eye-gaze corresponding to the first position identified in operation 840, to a focus-time (second threshold time) stored in memory.

It is to be noted that, to perform "people focus" on a video or "content focus" on shared content, a check is performed. Memory of the computing device stores a threshold time value corresponding to a focus-time. Operation 855 includes performing the check, i.e., determining if the duration of eye-gaze is higher than the focus-time. If the duration of eye-gaze is longer than the focus-time, then method 800 moves from operation 855 to operation 860.

Operation 860 includes enabling a zoom-in of the video or shared content corresponding to the first position identified in operation 840. Method 800 then moves to operation 850 for continuous comparison with the focus-time. Operation 855 is again performed to check if the user is still gazing at the focused video or shared content. People focus" on a video or "content focus" on shared content is continued to be performed, and if the duration of eye-gaze is now shorter than the focus-time, then method 800 moves to operation 870. Operation 870 includes zooming-out the person in the video or zooming-out the text and/or images in the shared content, when a user is not gazing at that particular video or shared content for a considerably long time.

Memory may save two threshold values, including an upper bound focus-time and a lower bound focus-time. If the duration of eye-gaze of a video and/or shared content is longer than the upper bound focus-time, zoom-in may be enabled for that video and/or shared content, and if the duration of eye-gaze of a video and/or shared content is shorter than the lower bound focus-time, zoom-out may be enabled for that video and/or shared content.

Operation 860 may also include applying super-resolution to the zoomed-in video or shared content. As the user's eye-gaze changes to another video or shared content, operations of method 800 may continuously process the video streams acquired at a computing device and the duration and position of eye-gaze to perform "people focus" on a video or "content focus" on shared content.

Figure 9C:
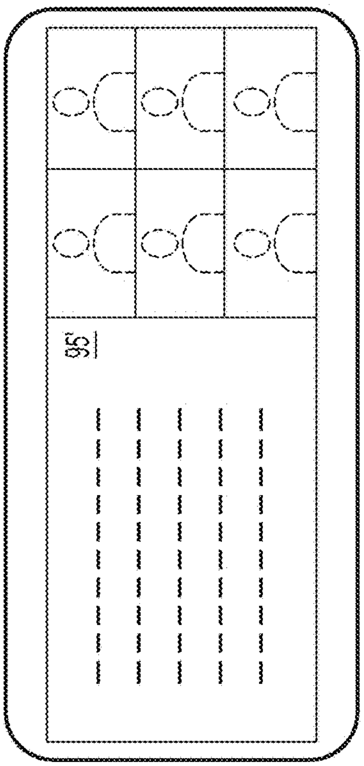
FIG. 9C is schematic diagram depicting an audio and video communication session with content focus applied to shared content on a computing device, according to an example embodiment.
Figure 9A:
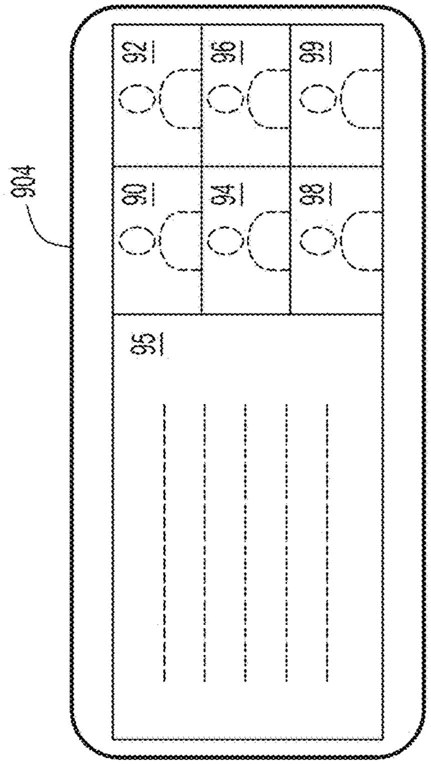
FIG. 9A is schematic diagram depicting shared content and videos of an audio and video communication session on a computing device, according to an example embodiment.
Figure 9B:
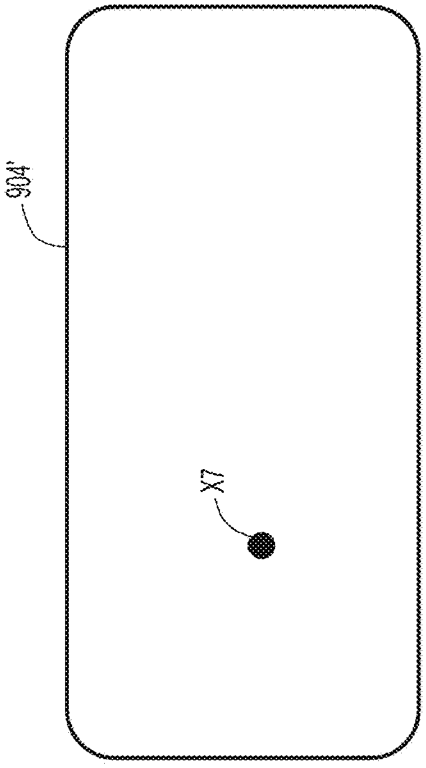
FIG. 9B is a schematic diagram depicting a center-point of eye-gaze of a user on a computing device, according to an example embodiment.

Referring now to FIGS. 9A, 9B, and 9C, illustrate an example of the techniques presented herein, such as method 800 of FIG. 8. FIG. 9A illustrates panel 904 displaying an example audio and video communication session including videos 90, 92, 94, 96, 98 and 99 and shared content 95 displayed on a display unit of the computing device. Eye-tracking technology is employed as described in method 800, operation 830. Consider FIG. 9B, illustrating panel 904'. It is to be noted that panel 904' in FIG. 9B is same as panel 904 in FIG. 9A, FIG. 9B is illustrating the result of eye-tracking technology.

Point X7 in FIG. 9B, on panel 904' represents a center-point of eye-gaze of a user in front of panel 904' (or 904). Eye-tracking technology also provides duration of eye-gaze of user associated to point X7. Shared content 95 of FIG. 9A is identified to be corresponding to point X7 of FIG. 9B using the location of point X7 on the panel 904' and the bounding box area of shared content 95 on panel 904 by executing software instructions including operations 840.

Memory of the computing device further implements operations 850 and 855 of FIG. 8, for example, to determine if the user gazes at the shared content 95 in FIG. 9A for longer than a threshold amount of time, e.g., focus-time. If the user gazes at the shared content 95 for a duration longer than a focus-time, content focus is performed on the shared content 95', as shown in FIG. 9C (The dashed lines in FIG. 9A changed to bold dashed lines in FIG. 9C are an interpretation of focusing in FIG. 9C). In an aspect of the techniques presented herein, super-resolution may also be applied to shared content 95'.

Figure 10:
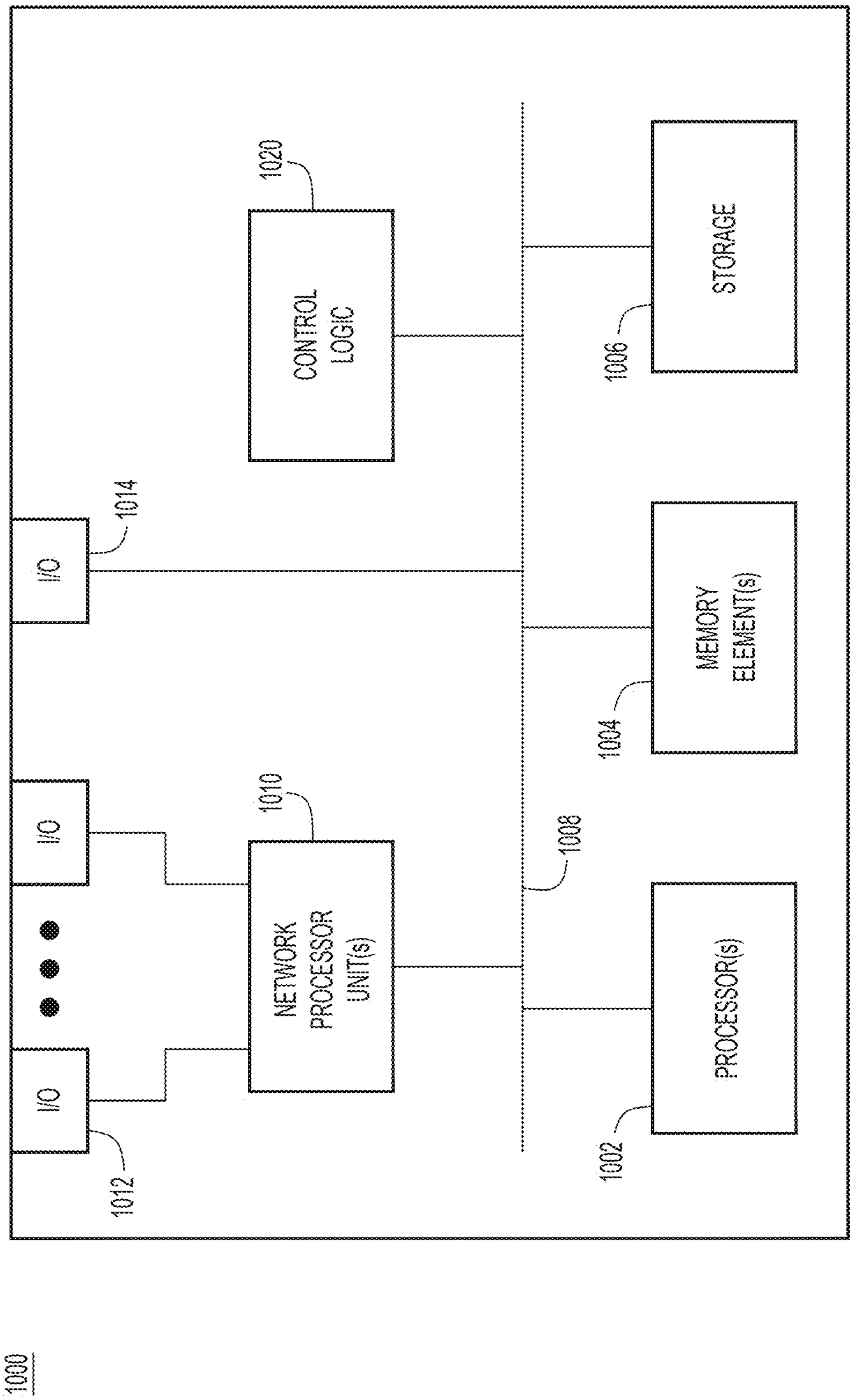
FIG. 10 is a hardware block diagram depicting a computing device, according to an example embodiment.

Referring to FIG. 10, FIG. 10 illustrates a hardware block diagram of a device 1000 that may employ techniques described above in connection with FIGS. 1, 2, 3A, 3B, 4, 5A, 5B, 5C, 6, 7A, 7B, 7C, 8, 9A, 9B, and 9C. Computing device 1000 may be representative of a computing device suitable for the implementation of some or all of the functions of computing devices 102A-102N, and/or conference server 140 in accordance with example embodiments. It should be appreciated that FIG. 10 provides only an illustration of one embodiment and does not imply any limitations with regard to the environments in which different embodiments may be implemented. Many modifications to the depicted environment may be made.

In at least one embodiment, the device 1000 may be any apparatus that may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for device 1000 can overlap in any manner and are not limited to the specific allocation of instructions and/or operations described herein.

In at least one embodiment, processor(s) 1002 is/are at least one hardware processor configured to execute various tasks, operations, and/or functions for device 1000 as described herein according to software and/or instructions configured for device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with device 1000, and/or logic configured for memory element(s) 1004 and/or storage 1006. For example, any logic described herein (e.g., control logic 1020) can, in various embodiments, be stored for device 1000 using any combination of memory element(s) 1004 and/or storage 1006. Note that in some embodiments, storage 1006 can be consolidated with memory element(s) 1004 (or vice versa) or can overlap/exist in any other suitable manner.

In at least one embodiment, bus 1008 can be configured as an interface that enables one or more elements of device 1000 to communicate in order to exchange information and/or data. Bus 1008 can be implemented with any architecture designed for passing control, data and/or information between processors, memory elements/storage, peripheral devices, and/or any other hardware and/or software components that may be configured for device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method, including: obtaining one or more video streams from one or more computing devices and displaying the one or more video streams on a display device; acquiring a layout of the displayed one or more video streams and a position at which each of the one or more video streams is displayed in the layout; obtaining, via an eye-tracking module, a location, a duration, and a frequency of eye-gaze of a user associated to the display device; identifying a first position in the layout that matches the location of eye-gaze of the user and comparing the duration of eye-gaze of the user to a first threshold time; and applying super-resolution to at least one of the one or more video streams that corresponds to the first position when the duration of eye-gaze is longer than the first threshold time.

In some aspects, the techniques described herein relate to a method, further including comparing the frequency of eye-gaze to a threshold value and pinning the at least one of the one or more video streams, that corresponds to the first position, to the layout when the frequency of eye-gaze is higher than the threshold value.

In some aspects, the techniques described herein relate to a method, further including un-pinning the at least one video stream that is pinned from the layout when the frequency of eye-gaze is lower than the threshold value.

In some aspects, the techniques described herein relate to a method, further including comparing the duration of eye-gaze to a second threshold time and enabling a zoom-in of the at least one of the one or more video streams when the duration of eye-gaze is longer than the second threshold time.

In some aspects, the techniques described herein relate to a method, further including enabling a zoom-out of the at least one video stream that is zoomed-in when the duration of eye-gaze is lower than the second threshold time.

In some aspects, the techniques described herein relate to a method, wherein applying super-resolution includes: applying a first degree of super-resolution to the at least one of the one or more video streams and applying a second degree of super-resolution to neighboring video streams of the at least one of the one or more video streams in the layout, wherein the second degree of super-resolution is a lower resolution than the first degree of super-resolution.

In some aspects, the techniques described herein relate to a method, wherein the at least one of the one or more video streams includes a text or an image.

In some aspects, the techniques described herein relate to a method, wherein the one or more video streams include video of one or more users of the respective one or more computing devices.

In some aspects, the techniques described herein relate to a method, wherein obtaining the one or more video streams includes requesting one or more higher-resolution video streams from the one or more computing devices.

In some aspects, the techniques described herein relate to a method, further including resizing the layout of the one or more video streams on the display device and remapping, via the eye-tracking module, the location, the duration, and the frequency of eye-gaze of the user associated to the display device.

In some aspects, the techniques described herein relate to one or more non-transitory computer readable storage media encoded with instructions that, when executed by a computer processor, cause the computer processor to perform operations including: acquiring one or more video streams and displaying the one or more video streams on a display device; acquiring a layout of the displayed one or more video streams and a position at which each of the one or more video streams is displayed in the layout; obtaining, via an eye-tracking module, a location, a duration and a frequency of eye-gaze of a user associated to the display device; identifying a first position in the layout that matches the location of eye-gaze of the user; comparing the duration of eye-gaze of the user to a first threshold time; and applying super-resolution to at least one of the one or more video streams that corresponds to the first position when the duration of eye-gaze is longer than the first threshold time.

In some aspects, the techniques described herein relate to one or more non-transitory computer readable storage media, further including: comparing the frequency of eye-gaze to a threshold value and pinning the at least one of the one or more video streams, that corresponds to the first position, to the layout when the frequency of eye-gaze is higher than the threshold value.

In some aspects, the techniques described herein relate to one or more non-transitory computer readable storage media, further including: un-pinning the at least one video stream that is pinned from the layout when the frequency of eye-gaze is lower than the threshold value.

In some aspects, the techniques described herein relate to one or more non-transitory computer readable storage media, further including: comparing the duration of eye-gaze to a second threshold time and enabling a zoom-in of the at least one of the one or more video streams when the duration of eye-gaze is longer than the second threshold time.

In some aspects, the techniques described herein relate to one or more non-transitory computer readable storage media, further including: enabling a zoom-out of the at least one video stream that is zoomed-in when the duration of eye-gaze is lower than the second threshold time.

In some aspects, the techniques described herein relate to one or more non-transitory computer readable storage media, wherein applying super-resolution includes: applying a first degree of super-resolution to the at least one of the one or more video streams and applying a second degree of super-resolution to neighboring video streams of the at least one of the one or more video streams in the layout, wherein the second degree of super-resolution is a lower resolution than the first degree of super-resolution.

In some aspects, the techniques described herein relate to one or more non-transitory computer readable storage media, further including resizing the layout of the one or more video streams on the display device and remapping, via the eye-tracking module, the location, the duration and the frequency of eye-gaze of the user associated to the display device.

In some aspects, the techniques described herein relate to an apparatus, including: a display device configured to display one or more video streams obtained from one or more computing devices; an eye-tracking module configured to provide a location, a duration and a frequency of eye-gaze of a user associated to the display device; and a processor configured to execute software instructions to: acquire a layout of the displayed one or more video streams and a position at which each of the one or more video streams is displayed in the layout; identify a first position in the layout that matches the location of eye-gaze of the user; compare the duration of eye-gaze of the user to a first threshold time; and apply super-resolution to at least one of the one or more video streams corresponding to the first position when the duration of eye-gaze is longer than the first threshold time.

In some aspects, the techniques described herein relate to an apparatus, wherein the processor is further configured to compare the frequency of eye-gaze to a threshold value and pin the at least one of the one or more video streams, that corresponds to the first position, to the layout when the frequency of eye-gaze is higher than the threshold value.

In some aspects, the techniques described herein relate to an apparatus, wherein the processor is further configured to compare the duration of eye-gaze to a second threshold time and enable a zoom-in of the at least one of the one or more video streams when the duration of eye-gaze is longer than the second threshold time.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source, and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data, or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or' variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method, comprising:

obtaining one or more video streams from one or more computing devices and displaying the one or more video streams on a display device;

acquiring a layout of the displayed one or more video streams and a position at which each of the one or more video streams is displayed in the layout;

obtaining, via an eye-tracking module, a location, a duration, and a frequency of eye-gaze of a user associated with the display device;

identifying a first position in the layout that matches the location of eye-gaze of the user and comparing the duration of eye-gaze of the user to a first threshold time;

applying super-resolution using an algorithm to a first video stream of the one or more video streams that corresponds to the first position when the duration of eye-gaze is longer than the first threshold time; and comparing the duration of eye-gaze to a second threshold time and enabling a zoom-in of contents included in the first video stream when the duration of eye-gaze is longer than the second threshold time.

2. The method of claim 1, further comprising: comparing the frequency of eye-gaze to a threshold value and pinning, to the layout, the first video stream of the one or more video streams, that corresponds to the first position, when the frequency of eye-gaze is higher than the threshold value.

3. The method of claim 2, further comprising: un-pinning the first video stream that is pinned from the layout when the frequency of eye-gaze is lower than the threshold value.

4. The method of claim 1, further comprising: enabling a zoom-out of the contents included in the first video stream when the duration of eye-gaze is lower than the second threshold time.

5. The method of claim 4, wherein the contents included in the first video stream is at least one selected from a group including a person and a shared data.

6. The method of claim 1, wherein applying super-resolution comprises:

applying a first degree of super-resolution to the first video stream of the one or more video streams and applying a second degree of super-resolution to neighboring video streams of the first video stream in the layout, wherein the second degree of super-resolution is a lower resolution than the first degree of super-resolution.

7. The method of claim 1, wherein the one or more video streams comprise a text or an image.

8. The method of claim 1, wherein the one or more video streams comprise video of one or more users of the respective one or more computing devices.

9. The method of claim 1, wherein obtaining the one or more video streams comprises requesting one or more higher-resolution video streams from the one or more computing devices.

10. The method of claim 1, further comprising resizing the layout of the one or more video streams on the display device and remapping, via the eye-tracking module, the location, the duration, and the frequency of eye-gaze of the user associated with the display device.

11. One or more non-transitory computer readable storage media encoded with instructions that, when executed by a computer processor, cause the computer processor to perform operations including:

acquiring one or more video streams and displaying the one or more video streams on a display device;

acquiring a layout of the displayed one or more video streams and a position at which each of the one or more video streams is displayed in the layout;

obtaining, via an eye-tracking module, a location, a duration, and a frequency of eye-gaze of a user associated with the display device;

identifying a first position in the layout that matches the location of eye-gaze of the user;

comparing the duration of eye-gaze of the user to a first threshold time;

applying super-resolution using an algorithm to a first video stream of the one or more video streams that corresponds to the first position when the duration of eye-gaze is longer than the first threshold time; and comparing the duration of eye-gaze to a second threshold time and enabling a zoom-in of contents included in the first video stream when the duration of eye-gaze is longer than the second threshold time.

12. The one or more non-transitory computer readable storage media of claim 11, further comprising: comparing the frequency of eye-gaze to a threshold value and pinning, to the layout, the first video stream of the one or more video streams, that corresponds to the first position, when the frequency of eye-gaze is higher than the threshold value.

13. The one or more non-transitory computer readable storage media of claim 12, further comprising: un-pinning the first video stream that is pinned from the layout when the frequency of eye-gaze is lower than the threshold value.

14. The one or more non-transitory computer readable storage media of claim 11, further comprising: enabling a zoom-out of the contents included in the first video stream when the duration of eye-gaze is lower than the second threshold time.

15. The one or more non-transitory computer readable storage media of claim 14, wherein the contents included in the first video stream is at least one selected from a group including a person and a shared data.

16. The one or more non-transitory computer readable storage media of claim 11, wherein applying super-resolution comprises:

applying a first degree of super-resolution to the first video stream of the one or more video streams and applying a second degree of super-resolution to neighboring video streams of the first video stream in the layout, wherein the second degree of super-resolution is a lower resolution than the first degree of super-resolution.

17. The one or more non-transitory computer readable storage media of claim 11, further comprising resizing the layout of the one or more video streams on the display device and remapping, via the eye-tracking module, the location, the duration, and the frequency of eye-gaze of the user associated with the display device.

18. An apparatus, comprising:

a display device configured to display one or more video streams obtained from one or more computing devices;

an eye-tracking module configured to provide a location, a duration, and a frequency of eye-gaze of a user associated with the display device; and a processor configured to execute software instructions to:

acquire a layout of the displayed one or more video streams and a position at which each of the one or more video streams is displayed in the layout;

identify a first position in the layout that matches the location of eye-gaze of the user;

compare the duration of eye-gaze of the user to a first threshold time;

apply super-resolution using an algorithm to a first video stream of the one or more video streams corresponding to the first position when the duration of eye-gaze is longer than the first threshold time; and compare the duration of eye-gaze to a second threshold time and enable a zoom-in of contents included in the first video stream when the duration of eye-gaze is longer than the second threshold time.

19. The apparatus of claim 18, wherein the processor is further configured to compare the frequency of eye-gaze to a threshold value and pin, to the layout, the first video stream of the one or more video streams, that corresponds to the first position, when the frequency of eye-gaze is higher than the threshold value.

20. The apparatus of claim 18, wherein the processor is further configured to enable a zoom-out of the contents included in the first video stream when the duration of eye-gaze is lower than the second threshold time, wherein the contents included in the first video stream is at least one selected from a group including a person and a shared data.

21. The method of claim 1, wherein at least a second video stream of the one or more video streams is not subject to applying super-resolution.

22. The one or more non-transitory computer readable storage media of claim 11, wherein at least a second video stream of the one or more video streams is not subject to applying super-resolution.

23. The apparatus of claim 18, wherein at least a second video stream of the one or more video streams is not subject to applying super-resolution.

* * * * *